(12) United States Patent
Martin et al.

(10) Patent No.: US 9,880,047 B2
(45) Date of Patent: Jan. 30, 2018

(54) FIBER OPTIC DISTRIBUTED VIBRATION SENSING WITH DIRECTIONAL SENSITIVITY

(71) Applicant: Schlumberger Technology Corporation, Sugar Land, TX (US)

(72) Inventors: James Martin, Cambridgeshire (GB); Daniela Donno, Paris (FR); Bence Papp, Southhampton (GB); Arthur Hartog, Winchester (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 208 days.

(21) Appl. No.: 14/898,279

(22) PCT Filed: Jun. 13, 2014

(86) PCT No.: PCT/US2014/042226
§ 371 (c)(1),
(2) Date: Dec. 14, 2015

(87) PCT Pub. No.: WO2014/201313
PCT Pub. Date: Dec. 18, 2014

(65) Prior Publication Data
US 2016/0131520 A1 May 12, 2016

Related U.S. Application Data

(60) Provisional application No. 61/834,474, filed on Jun. 13, 2013.

(51) Int. Cl.
*G01V 1/52* (2006.01)
*G01D 5/353* (2006.01)
(Continued)

(52) U.S. Cl.
CPC ......... *G01H 9/004* (2013.01); *G01D 5/35361* (2013.01); *G01H 5/00* (2013.01); *G01V 1/52* (2013.01)

(58) Field of Classification Search
CPC ........ G01D 5/35361; G01V 1/52; G01H 5/00; G01H 9/004
(Continued)

(56) References Cited

U.S. PATENT DOCUMENTS 5,067,112 A   11/1991   Meek et al.
6,813,424 B1  11/2004   Dultz et al.
(Continued)

FOREIGN PATENT DOCUMENTS

GB   2222247 A       2/1990
JP   2011112543 A    6/2011
(Continued)

OTHER PUBLICATIONS

D.A. Barfoot, Efficient Vertical Seismic Profiling using Fiber-Optic Distributed Acoustic Sensing and Real-Time Processing, St Julian's, Malta, Apr. 21-24, 2013, Eage Borehole Geophysics Workshop II (3 pages).
(Continued)

*Primary Examiner* — J M Saint Surin
(74) *Attorney, Agent, or Firm* — Tuesday Kaasch

(57) ABSTRACT

Methods for determining separate velocity components of an acoustic wavefield that are incident on a distributed fiber optic sensor are disclosed. A fiber optic sensor includes fiber that is spatially distributed in non-parallel planes of a three-dimensional volume having three orthogonal axes. The fiber includes a first fiber pattern that is spatially distributed within a first plane of the three-dimensional volume, and a second fiber pattern that is spatially distributed within a second plane of the volume. The fiber patterns
(Continued)

are interrogated separately by a distributed fiber optic interrogation system. The individual responses from each pattern are combined and processed to determine separate velocity components of the acoustic wavefield relative to the orthogonal axes of the three-dimensional volume.

27 Claims, 12 Drawing Sheets

(51) Int. Cl.
   *G01H 5/00* (2006.01)
   *G01H 9/00* (2006.01)
(58) Field of Classification Search
   USPC .......................................................... 73/597
   See application file for complete search history.

(56) References Cited

U.S. PATENT DOCUMENTS

| | | | |
|---|---|---|---|
| 7,284,903 | B2 | 10/2007 | Hartog |
| 8,408,064 | B2* | 4/2013 | Hartog ............... E21B 47/101 |
| | | | 73/643 |
| 9,170,149 | B2* | 10/2015 | Hartog .................... E21B 41/00 |
| 9,250,112 | B2* | 2/2016 | Godfrey .................. G01F 1/66 |
| 2005/0076713 | A1 | 4/2005 | Knudsen et al. |
| 2006/0081772 | A1 | 4/2006 | Williams et al. |
| 2010/0107754 | A1 | 5/2010 | Hartog et al. |
| 2012/0035854 | A1 | 2/2012 | Kragh et al. |
| 2012/0060615 | A1 | 3/2012 | Farhadiroushan et al. |
| 2012/0067118 | A1* | 3/2012 | Hartog .................... E21B 41/00 |
| | | | 73/152.16 |
| 2012/0162639 | A1 | 6/2012 | Farhadiroushan et al. |
| 2012/0188533 | A1 | 7/2012 | Crickmore et al. |
| 2012/0257475 | A1 | 10/2012 | Luscombe et al. |
| 2012/0287749 | A1 | 11/2012 | Kutlik et al. |
| 2013/0091942 | A1* | 4/2013 | Samson ................. E21B 47/10 |
| | | | 73/152.18 |
| 2013/0222811 | A1 | 8/2013 | Handerek |
| 2014/0202240 | A1 | 7/2014 | Skinner et al. |
| 2016/0146661 | A1 | 5/2016 | Martin et al. |

FOREIGN PATENT DOCUMENTS

| | | |
|---|---|---|
| WO | WO2013011283 A2 | 1/2013 |
| WO | WO2013090544 A1 | 6/2013 |
| WO | WO2014022346 A1 | 2/2014 |

OTHER PUBLICATIONS

P.A.F. Christie (Schlumberger Cambridge Research) [2013], VSP: Toy, Tutorial or Tool, 2013 EAGE Borehole Geophysics Workshop II.

K.N. Madsen et al., Simultaneous Multiwell VSP using Distributed Acoustic Sensing, Stavanger Norway, Jul. 2-5, 2013, Eage Borehole Geophysics Workshop II (5 pages).

A. Mateeva et al., Distributed Acoustic Sensing (DAS) for Reservoir Monitoring with VSP, St Julian's, Malta, Apr. 21-24, 2013, Eage Borehole Geophysics Workshop II (5 pages).

D. Miller et al., Vertical Seismic Profiling Using a Fibre-optic Cable as a Distributed Acoustic Sensor, 74th EAGE Conference & Exhibition incorporating SPE EUROPEC 2012 Copenhagen, Denmark, Jun. 4-7, 2012 (5 pages).

Mestayer, J. et al., Field trials of distributed acoustic sensing for geophysical monitoring. 2011 SEG Annual Meeting, 4253-7.

James S. Sirkis and Henry W. Haslach, Jr. [1991] Complete Phase-Strain Model for Structurally Embedded Interferometric Optical Fiber Sensors, J. of Intell. Mater. Syst. And Struct., vol. 2, Jan. 1991 (22 pages).

Michael A. Chroma, Changhuei Yang, and Joseph A. Izatt [2003], Instantaneous quadrature low-coherence interferometry with 3×3 fiber-optic couplers, Optics Letters, vol. 28, No. 22, Nov. 15, 2003, 2162-2164.

I. B. Kwon, C. G. Kim and C. S. Hong [1999], A Digital signal processing algorithm for structural strain measurements by a 3×3 passive demodulated fiber optic interferometric sensor, Smart Mater. Struct., vol. 8, 1999, 433-440.

Zhiqiang Zhao, M. Suleyman Demokan and Mark MacAlpine [1997], Improved Demodulation Scheme for Fiber Optic Interferometers Using an Asymmetric 3×3 Coupler, Journal of Lightwave Technology, vol. 15, No. 11, Nov. 1997; 2068-2059.

J. Breguet and N. Gisin [1995], Interferometer using a 3×3 coupler and Faraday mirrors, Optics Letters, vol. 20, No. 12, Jun. 15, 1995; 1447-1449.

Micron Optics, Optical Fiber Sensors guide (Fundamentals & Applications) http://www.micronoptics.com/uploads/library/documents/Micron%20Optics%20Optical%20Sensing%20Guide.pdf (19 pages).

A. H. Hartog, L. B. Liokumovich, and O. I. Kotov, "The optics of distributed vibration sensing," in EAGE—Second EAGE Workshop on Permanent Reservoir Monitoring, Stavanger, Norway, Jul. 2-5, 2013 (5 pages).

M. Xie, P. Dabkiewicz, R. Ulrich, and K. Okamoto, "Side-hole fiber for fiber-optic pressure sensing," Optics Letters 11(5), 333-335 (1986).

International Search Report and Written Opinion issued in the related PCT Application PCT/US2014/042226, dated Oct. 12, 2014 (10 pages).

International Preliminary Report on Patentability issued in the related PCT Application PCT/US2014/042226, dated Dec. 15, 2015 (5 pages).

International Search Report and Written Opinion issued in the related PCT Application PCT/US2014/042231, dated Oct. 15, 2014 (17 pages).

International Preliminary Report on Patentability issued in the related PCT Application PCT/US2014/042231, dated Dec. 15, 2015 (12 pages).

Examination Report issued in the related GB Application 1520845.7 dated May 23, 2017 (7 pages).

* cited by examiner

INTERROGATION AND ACQUISITION UNIT

US 9,880,047 B2

FIBER OPTIC DISTRIBUTED VIBRATION SENSING WITH DIRECTIONAL SENSITIVITY

RELATED APPLICATIONS

This application claims priority to U.S. provisional application Ser. No. 61/834,474, filed Jun. 13, 2013, which is incorporated by reference herein in its entirety.

BACKGROUND

Fiber optic sensors employ the fact that environmental effects, such as pressure, strain, vibration, and temperature, can alter the amplitude, phase, frequency, spectral content, or polarization of light propagated through an optical fiber. Advantages of fiber optic sensors include their light weight, small size, passive nature, energy efficiency, and ruggedness. In addition, fiber optic sensors have the potential for very high sensitivity, and wide bandwidth. Yet further, certain classes of sensors can be distributed along the length of an optical fiber so that an appropriate interrogation system can be employed to monitor selected environmental parameters at multiple locations at the same time.

One application in which fiber optic sensors can be used is subterranean seismic surveying. In general, subterranean surveying can be used to determine the content of a subterranean structure (e.g., a hydrocarbon-bearing formation), which can be underneath a land surface or under a water bottom surface (e.g., seabed). Marine subterranean surveying involves deploying sensors that are towed through a body of water, or deployed on the water bottom surface. Land subterranean surveying involves deploying the sensors on the land surface or in a wellbore.

Seismic subterranean surveying employs seismic sources to generate seismic signals that are propagated into a subterranean structure. The propagated seismic signals are reflected from subterranean elements in the subterranean structure, where the reflected signals are detected by the seismic sensors. The data collected by the seismic sensors are then processed to determine characteristics of the subterranean structure. One type of survey that can be performed is referred to as vertical seismic profiling, where a seismic source located at the surface generates seismic signals that are detected by sensors that are located in a wellbore. Alternatively, the seismic source can be located in the wellbore and the sensor can be located at the surface or in another well. In the latter case, the technique is referred to as cross-well seismic surveying.

Fiber optic sensors also can be used in systems that are arranged to monitor certain parameters (e.g., pressure, temperature, strain, etc.) in a region of interest. For instance, when deployed in a hydrocarbon well, a fiber optic sensor can provide indications of characteristics of production fluids, such as fluid composition, density, viscosity, flow rate, etc. Various drilling, production and remedial operations can then be performed based on the information derived from the monitored parameters.

BRIEF DESCRIPTION OF THE DRAWINGS

Certain embodiments of the invention are described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current invention.

DETAILED DESCRIPTION

Figure 1:
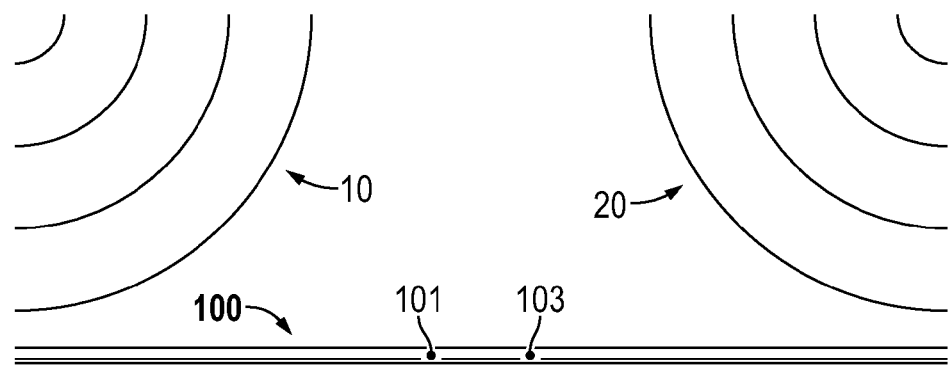
FIG. 1 is a schematic representation of an acoustic wavefield arriving on an optical fiber sensor from different directions.

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Seismic surveying generally involves generating seismic signals using a seismic source. The seismic signals propagate through a subterranean formation where they are reflected from various subterranean elements. The reflected signals are detected by the seismic sensors. The data collected by the seismic sensors are then processed to determine characteristics of the subterranean structure. A fiber optic surveying system, such as system that employs an optical fiber that is configured to provide a distributed response to acoustic events, can be used to monitor propagation of the seismic signals through the subterranean region of interest.

Reservoir monitoring generally involves determining downhole parameters at various locations in a producing well over an extended period of time. Characteristics of fluid flow in a well are of particular interest, including fluid density, viscosity, flow rate and composition (e.g., fractional composition of gas/water/oil). In general, one way to detect fluid flow is to monitor the ambient vibration or acoustic noise associated with the flow in a region of interest. This vibration or acoustic noise can be logged as a function of location and, thus, provide valuable information that can be used to control and/or enhance production, to perform remedial measures, and/or to assess well integrity (e.g., casing leaks, etc.). A fiber optic monitoring system, such as a system that employs an optical fiber that is configured to provide a distributed response to acoustic events, can be used to monitor the ambient flow noise in the region of interest.

In general, fiber optic monitoring systems, particularly distributed fiber-optic monitoring systems, employ an optical source (e.g., a laser) to generate pulses of optical energy to launch into an optical fiber that is deployed in a region of interest (e.g., in a wellbore). As the launched pulses travel along the length of the optical fiber, small imperfections in the fiber reflect a portion of the pulses, generating backscatter. When the fiber is subjected to strain (such as from vibration or acoustic signals propagating through the region of interest), the distances between the imperfections change. Consequently, the backscattered light also changes. By monitoring the changes in the backscatter light generated by the fiber in response to interrogating pulses, it is possible to determine the dynamic strain, or vibration, experienced by the fiber. The measured strain or vibration can then be used to derive information about the parameters of interest.

One type of fiber optic monitoring system is referred to as a Distributed Vibration Sensing (DVS) system or, alternatively, a Distributed Acoustic Sensing (DAS) system. For convenience, both DVS and DAS systems are generally referred to herein as a DVS system. DVS systems have been used to efficiently gather seismic data in applications such a pipeline security monitoring and vertical seismic profiling. DVS systems also have been deployed to monitor fluid flow in subterranean wellbores. While DVS systems have been used in these various applications, little is known about what a DVS sensor actually measures and how this measurement relates to more conventional means of measuring acoustic signals, such as with an array of geophones. Absent this knowledge, determinations of real physical properties of the subsurface and reservoir becomes more difficult, particularly since comparisons between seismic surveys or logging profiles obtained using a DVS system will not be able to be made with those obtained using legacy systems.

Accordingly, embodiments of the systems and methods described herein take advantage of the enhanced understanding of the physics associated with measurements obtained from a DVS system. This enhanced understanding has been leveraged to develop configurations of distributed vibration sensors and data processing techniques that provide measurement results, including results that correspond to directional velocity components of a vibration field, that more closely resemble measurements obtained from the arrays of geophones, accelerometers and hydrophones that have been used in legacy systems.

Polarity Insensitivity of DVS Sensor Measurements

A DVS sensor (in the form of a straight fiber) measures the velocity component of an acoustic wavefield that is orientated in-line with the fiber. As such, the response of the DVS sensor to the wavefield closely resembles the response of an in-line array of discrete moving-coil geophones spaced over the same length as the fiber sensor. However, the response of the DVS sensor differs in a significant manner. That is, when the direction of propagation of the acoustic wavefield is reversed, the velocity signal obtained from the fiber sensor retains the same polarity, while that of the moving-coil geophone undergoes a polarity reversal. In other words, a moving-coil geophone senses the direction of propagation of the acoustic wavefield. The distributed optical fiber sensor, on the other hand, is not sensitive to direction. This is because a fiber sensor experiences either a fiber expansion or contraction in response to an incident wavefield, and this expansion or contraction is the same no matter from which of the 0 degree or 180 degree shot azimuths the incident acoustic signal originates.

Consequently, the response of a distributed optical fiber sensor is insensitive to the direction of arrival of an acoustic wavefield. Therefore, unlike moving-coil geophones, the optical fiber sensor cannot distinguish up/down waves in a borehole or marine acquisition environment and/or in AVO/AVA (amplitude vs. offset, amplitude vs. angle) analyses, which limits use of a fiber optic sensor in such applications. However, knowledge of how an optical fiber sensor does respond to wavefields can be exploited to provide directional information. That is, when the response of the distributed fiber optic sensor is combined with the spatial gradient determined in the fiber axis direction, directional information can be obtained. As a result, seismic energy propagating up the fiber can be separated from energy propagating in the opposite direction.

Figure 2:
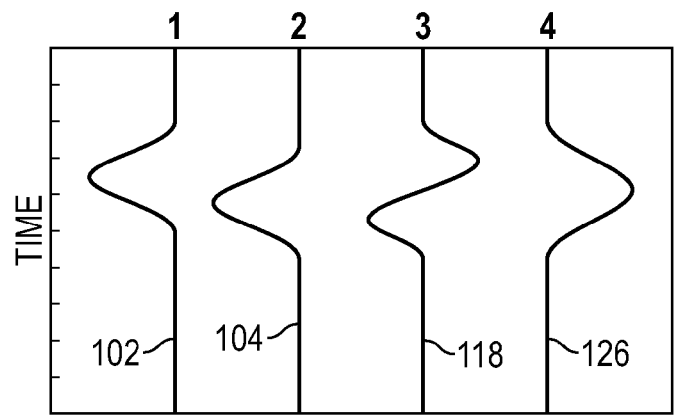
FIG. 2 is an exemplary measurement of the acoustic wavefield of FIG. 1 using an array of geophones.
Figure 3:
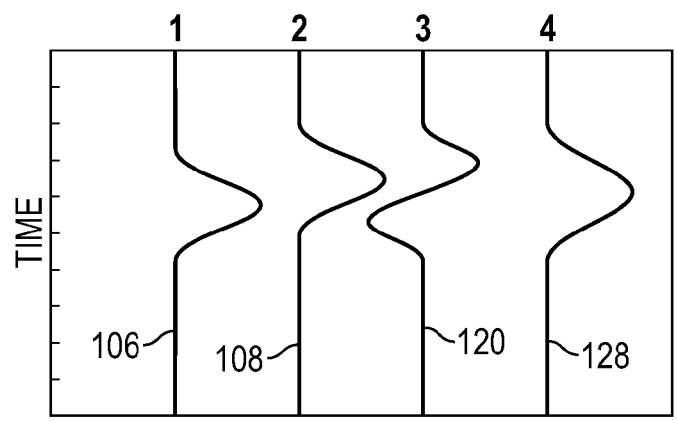
FIG. 3. is an exemplary measurement of the acoustic wavefield of FIG. 1 using an array of geophones.

Approaches for providing a directional interpretation of the fiber-recorded data using spatial gradients are now described. Referring to FIG. 1, let us consider acoustic wavefields 10 and 20 arriving on a sensing device 100 (e.g., a geophone, an optical fiber, etc.) from opposite directions. An exemplary response to the wavefields 10, 20 of a geophone or other direction-sensitive sensor that is used as the sensing device 100 is shown in FIGS. 2 and 3. FIG. 2 illustrates the response of two geophones placed next to each other at respective locations 101 and 103 to the wavefield 10, which is arriving from the left side in FIG. 1. The response is represented by traces 102 and 104. FIG. 3 illustrates the response of the geophones at locations 101, 103 to the wavefield 20, which is arriving from the right side in FIG. 1. The response is represented by traces 106, 108. As shown by traces 102, 104, 106, 108, the seismic waves 10 and 20 recorded by the geophones have opposite polarity.

Figure 4:
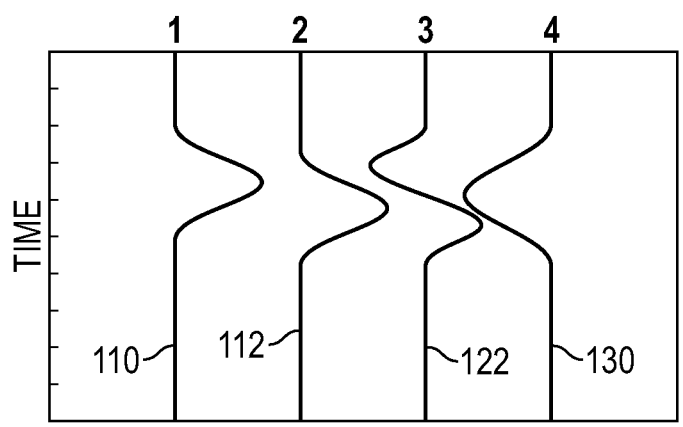
FIG. 4 is an exemplary measurement of the acoustic wavefield of FIG. 1 using a distributed fiber optic vibration sensor.
Figure 5:
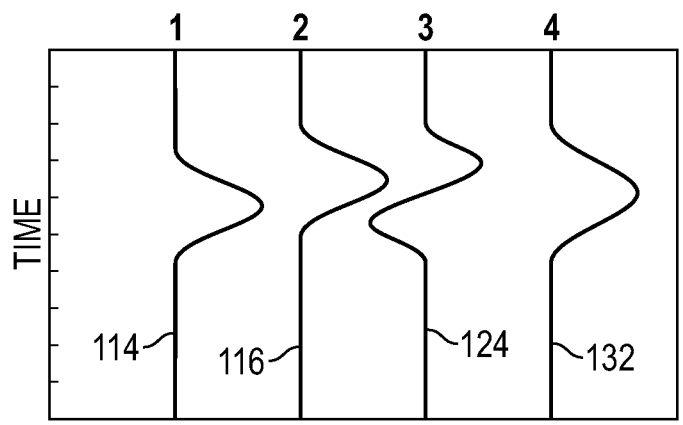
FIG. 5 is an exemplary measurement of the acoustic wavefield of FIG. 1 using a distributed fiber optic vibration sensor.

The response of a distributed optical fiber sensor that is used as the device 100 is shown in FIGS. 4 and 5. Although not shown in detail here, the optical fiber sensing systems disclosed herein include an interrogation and acquisition system that is configured to launch optical energy into the optical fiber sensor and to receive and process backscatter light that is generated by the optical fiber in response to the interrogation energy. The response of the distributed optical fiber sensor shown in FIGS. 4 and 5 was obtained using such an interrogation and acquisition system.

Traces 110 and 112 in FIG. 4 represent the response of two consecutive measurement points (at locations 101, 103) of the distributed optical fiber to the wavefield 10, which is arriving from the left side in FIG. 1. Traces 114 and 116 in FIG. 5 represent the response at locations 101, 103 of the distributed optical fiber to the wavefield 20 arriving from the right side in FIG. 1. In contrast to FIGS. 2 and 3, the measurements obtained from an optical fiber sensor 100 show waves having the same polarity, but with different arrival times.

Traces 118, 120, 122, 124 in FIGS. 2-5 respectively show the spatial gradient, which is the difference between the first two traces in each of FIGS. 2-5. Specifically, trace 118 is the difference between traces 104 and 102; trace 120 is the difference between traces 108 and 106; trace 122 is the difference between traces 112 and 110; and trace 124 is the difference between traces 116 and 114. Finally, traces 126, 128, 130, 132 in each of FIGS. 2-5 are obtained by applying a 90 degree phase shift to the spatial gradient represented by the traces 118, 120, 122, 124, respectively. As a result, in FIG. 4, the polarity of trace 130 provides directional information for the fiber sensor 100.

Having determined the spatial gradient, it then can be used to compute a polarity mask that can be applied to the fiber data that provides for a directionality interpretation of the data. In other embodiments, a polarity mask can be provided by employing a direction-sensitive sensor (e.g., a fiber accelerometer) in combination with the distributed fiber sensor. In either case, the polarity mask (either the calculated mask or the mask obtained from the measurement of a direction-sensitive sensor) can be applied to the fiber data to provide for a directional data interpretation. For instance, in marine and borehole applications, use of the polarity mask allows up and down moving wavefields to be distinguished from one another.

Non-linear Fiber Pattern DVS Sensors

DVS systems often are implemented with optical fibers that are spatially distributed and deployed in a region of interest in a straight line. However, the spatial distribution of an optical fiber sensor can be in an arrangement other than a straight line. As examples, an optical fiber sensor can be coiled or curved in any of a variety of patterns. These spatial arrangements can alter the sensitivity of the optical fiber to the incident velocity of an acoustic wavefield. This characteristic of a fiber optic sensor can be used to implement a high fidelity DVS sensing system that can distinguish between orthogonal components of the incident acoustic wavefield, so as to achieve a vector measurement that closely resembles that achieved when using traditional three-component velocity or acceleration sensors.

Figure 6:
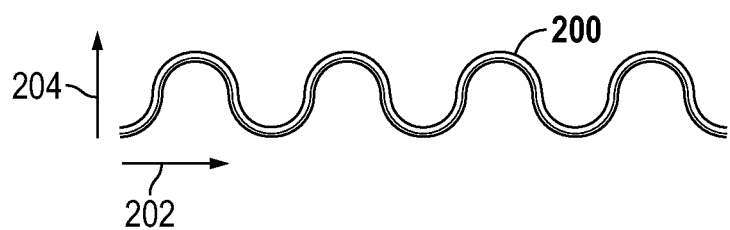
FIG. 6 is an exemplary fiber pattern for a distributed fiber optic vibration sensor, according to an embodiment.

In an exemplary embodiment shown in FIG. 6, a fiber optic sensor 200 is deployed in a spatial arrangement corresponding to a serpentine pattern in a horizontal plane. In this example, 50% of the fiber length is orientated in the direction of 0 degrees azimuth (i.e., in-line direction 202) and 50% of the fiber length is orientated in the direction of 90 degrees azimuth (i.e., cross-line direction 204). When interrogated using known interferometer-type of interrogation and acquisition techniques (such as used in a heterodyne distributed vibration sensing system), the response of the serpentine pattern in this example is approximately equivalent to summing 50% of the X component (in-line) geophone array with 50% of the Y component (cross-line) geophone array, where the array length in the in-line direction is substantially the same as the length of the serpentine pattern of the fiber optic sensor 200 in the in-line direction 202. In other embodiments using different interrogation techniques (including known distributed acoustic sensing techniques), the acquired response of the pattern can be different, but still bears a relationship to the sum of the vector length of the optical fiber in each direction of the pattern.

This concept can be applied in general to derive rules for calculating and separating orthogonal measurements of the acoustic wavefield that is incident on a fiber optic sensor arranged in a particular spatial pattern. That is, the directional sensitivity of either a two-dimensional or a three-dimensional spatial pattern of an optical fiber is dictated by the sum of the vector length of fiber in each direction. The number of orientated patterns into which the fiber is arranged determines the number of orthogonal components that can be separated out. Thus, for instance, if two orthogonal components are desired, then two appropriately orientated patterns can be used to solve the resulting vectorial simultaneous equations. Similarly, if three orthogonal components are desired, three orientated patterns are needed.

Each spatial pattern can then be interrogated separately. In some embodiments, separate interrogation can be achieved by using a separate set of signal acquisition equipment for each pattern. In other embodiments, for example, the fiber can be looped back on itself. Thus, for example, a first orientation can be interrogated by launching interrogation signals into a first end of the fiber, and a second orientation can be interrogated by launching interrogation signals into the second opposing end of the fiber. In such embodiments, a third pattern can be interrogated by splicing another fiber onto the looped back end of the fiber. In this manner, a single fiber can be arranged so that different sections of the fiber are spatially arranged in different patterns that are distributed in two or three orthogonal planes.

Figure 7:
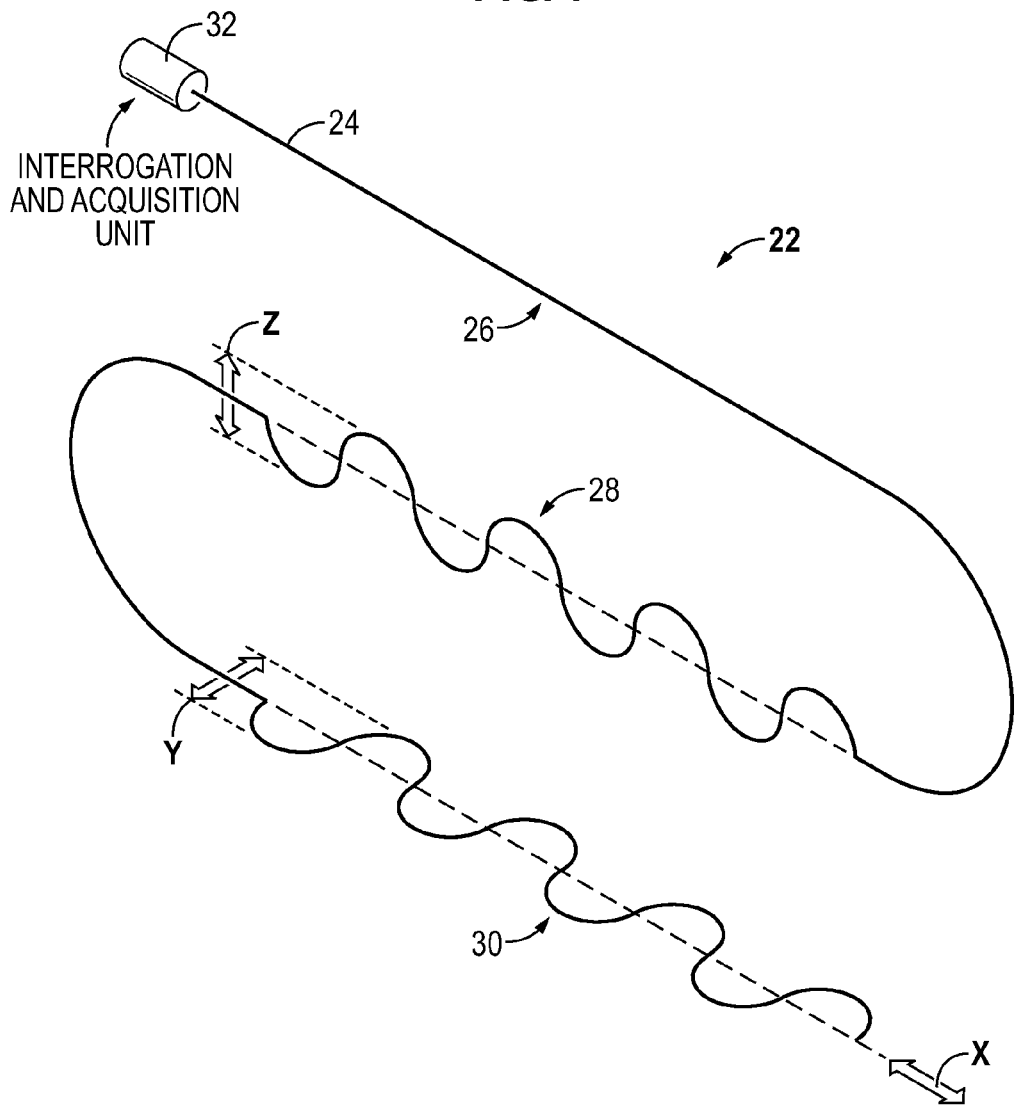
FIG. 7 is a schematic representation of an exemplary multi-component distributed fiber optic vibration sensor, according to an embodiment.

An example of such an arrangement is schematically illustrated in FIG. 7, where a multi-component sensor 22 includes an optical fiber 24 having a first length 26 that is arranged in a straight line. A second length 28 of the fiber 24 loops back from the first length 26 and is arranged as a serpentine pattern distributed in a plane (e.g., the X-Z plane). A third length 30 of the fiber 24 loops back from the second length 28 and is arranged as a serpentine pattern in an orthogonal plane (e.g., the Y-X plane). The fiber 24 is optically coupled at one end to an interrogation and acquisition system 32 that is configured for a distributed vibration sensing system. In other embodiments, the fiber 24 can also be coupled at the other end to another interrogation and acquisition system. The multi-component sensor 22 can be built into one physical sensor unit and implemented, for instance, as a downhole tool that is deployed in a wellbore. For instance, the fiber 24 can be mounted on a mandrel or other support structure so that the first length 26 is arranged in a straight line that extends the length of the mandrel, the second length 28 loops back from the first length 26 and is mounted on the mandrel in a serpentine pattern distributed in the X-Z plane, and the third length 30 loops back from the second length 28 and is mounted on the mandrel in a serpentine pattern distributed in the Y-X plane.

In each of these embodiments, each spatial pattern can be interrogated using any known distributed fiber optic data acquisition techniques.

A number of embodiments are presented below to further illustrate the manner in which the spatial distribution of an optical fiber sensor can be used to distinguish between orthogonal components of an acoustic wavefield that is incident on the optical fiber sensor.

Figure 8:
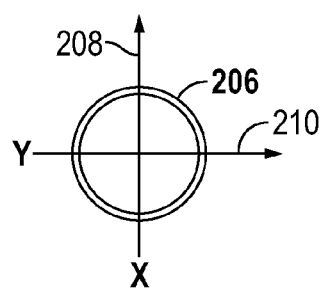
FIG. 8 is another exemplary fiber pattern for a distributed fiber optic vibration sensor, according to an embodiment.

In one embodiment, a fiber sensor 206 is distributed in the shape of a circle, as shown in FIG. 8. In this embodiment, the DVS optical fiber is arranged in the form of a circle in the horizontal plane. Consequently, the cumulative vector length of fiber is the same in each of the X direction 208 and Y direction 210. Because the circle is in the horizontal plane, there is no fiber length distributed in the vertical Z direction. Accordingly, the circular fiber distribution of the arrangement in FIG. 8 has a response of (X+Y) in terms of velocity in each of the in-line and cross-line directions 208, 210.

Figure 9:
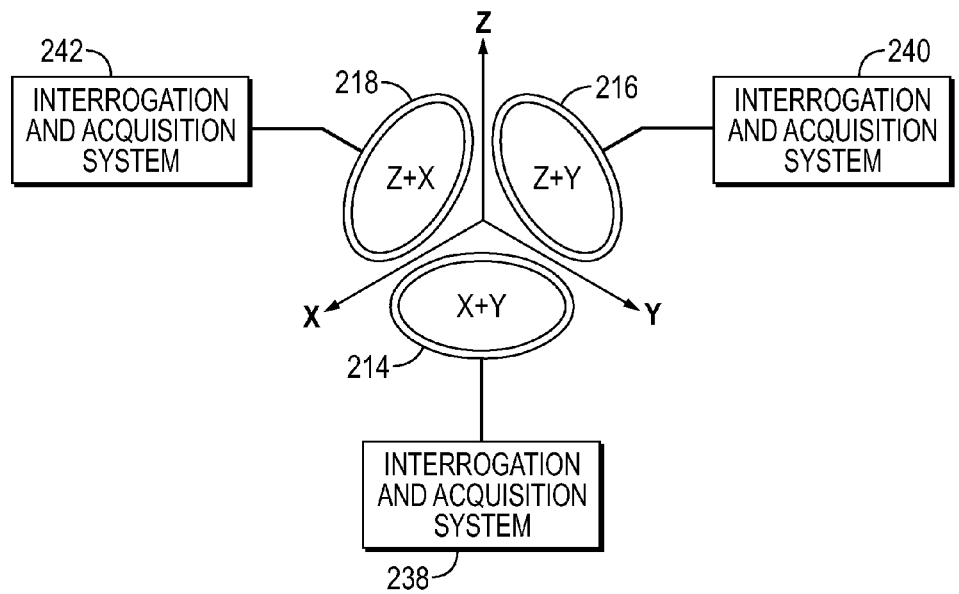
FIG. 9 is a schematic illustration of a composite fiber optic sensor with three fiber patterns spatially distributed in orthogonal planes, according to an embodiment.

The distributed arrangement of FIG. 8 can be extended as shown in FIG. 9, which illustrates three circular fiber sensors 214, 216, 218 spatially arranged in three orthogonal planes. Each circular fiber sensor, 214, 216, 218 is sensitive to two vector components of the measurand so that the complete three sensor arrangement is sensitive to (X+Y), (Z+Y) and (Z+X), respectively. Because there are three equations and three unknowns, the responses of each circular sensor 214, 216, 218 can be combined to determine each of the X, Y, and Z components of the acoustic velocity components separately. Thus, for example:

$$(Z+X)+(Z+Y)-(X+Y)=2Z$$

$$(Z+X)+(X+Y)-(Z+Y)=2X$$

$$(Z+Y)+(X+Y)-(Z+X)=2Y$$

In some embodiments, the sensitivity of the fiber optic sensors can be enhanced by combining multiple windings of the fiber within each pattern. That is, the sensitivity of a sensor having a circular pattern can be increased by laying multiple circles of fiber upon each other. Furthermore, multiple windings with different radii can be employed so as to broaden the sensitivity of the sensor to different frequency contents (i.e., different fiber lengths or effective fiber lengths have different frequency responses, as will be discussed in further detail below with respect to the wavenumber response of a distributed optical fiber).

Regardless of the number of windings or radii, the ratio of the vector length of fiber in each of the two orthogonal directions from a circle is the same. Thus, for the circular sensor 214 in the (X+Y) directions, the length ratio in the X and Y directions is 1:1. In other embodiments, the length ratio of the sensor can be different than 1:1, provided it is known. Thus, for instance, instead of circles, the fiber sensors can have an oval shape. In such an embodiment, an oval sensor with a ratio of 2:1 in the X and Y directions would be twice as sensitive in the X direction as in the Y direction.

In applications in which the fiber sensors are employed, the sensors can be packaged in a manner that controls and maintains their length ratios in a known manner and the ratios can be selected as is best appropriate for the particular application. Various exemplary manufacturing techniques are described below.

In some embodiments, the sensors can be arranged so that the dimensions of the patterns are different in each of the orthogonal directions. In such embodiments, the wavenumber response, and hence frequency response, of each sensor is different. Different frequency responses provide further advantages for the overall measurement obtained from the sensors, as will be described in detail below.

Returning to the spatial patterns in which the fiber sensors are arranged, any of a variety of planar arrangements of fiber sensors and combinations of planar arrangement in different planes are contemplated herein, with circular and oval patterns being just two examples. As other examples, serpentine patterns or spiral patterns distributed over a plane also could be employed. By using various arrangements of sensing patterns, the loss of sensitivity to vibration with a normal incidence to the axis of the fiber (i.e., vibration in the cross-line direction) can be eliminated. That is, combining multiple sensing patterns allows the components (e.g., x, y, z) of the vibration signal to be estimated independently.

Serpentine and spiral patterns provide an additional benefit over a circular pattern in that greater lengths of fiber can be distributed over the area of the two dimensional plane being measured, resulting in an increase in the sensitivity and dynamic range of the sensor. The overall dimensions of the pattern of the sensor can be confined, but substantial lengths of fiber can be distributed within the pattern. Again, the ratio of the vector length of fiber in each direction can be any selected ratio, provided it is known.

In some embodiments, the pattern can be dimensioned so that it is small in relation to the wavelength of the incident acoustic energy. For instance, a pattern that is dimensioned so that it is less than a quarter of the minimum expected wavelength of the acoustic energy can provide a response that resembles the response of discrete or point sensors. In other embodiments, the dimensions of the pattern can be selected so as to provide the most advantages with respect to the measurement of the particular acoustic wavefield that is of interest. For instance, the patterned sensors can be used in various applications, including in land, seafloor, borehole, towed marine and permanently deployed systems for the measurement of an acoustic wavefield, and the pattern and dimensions of the pattern (which can range from centimeters to meters) can be selected that they are best suited for measuring the acoustic wavefield present in each of those environments.

In the exemplary embodiments discussed above, the fiber patterns are arranged in orthogonal planes. It should be understood, however, that the techniques and systems described herein contemplate that the fiber patterns can be arranged in planes that are non-parallel, but not orthogonal. As an example, the patterns can be spatially distributed in non-parallel planes of a tetrahedron or other volume having non-parallel planes. In such embodiments, the data set obtained from the non-parallel fiber patterns is not orthogonal, but the output data that is derived from the input data set (i.e., the separate velocity components of the incident wavefield) still can be determined relative to orthogonal axes of the volume.

Figure 10:
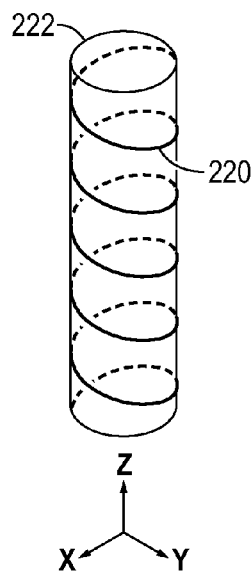
FIG. 10 is a schematic illustration of a fiber pattern for a distributed fiber optic vibration sensor, according to an embodiment.

The application of the rules of directional sensitivity that have been discussed above with respect to planar arrangements can also be extended to any pattern of fiber that is distributed over a three-dimensional volume. Consider, for example, a helically wound spiral 220 that is distributed along the length of a tubular or cylindrical structure 222 (e.g., a mandrel, a cable, etc.), as shown in FIG. 10. The dimensions of the tube and the lay angle (or pitch) of the helix can be designed to provide an effective vector length of fiber distributed over the length of the sensor so that the sensor is equally sensitive in the X, Y and Z directions, with an effective length ratio of 1:1:1.

Figure 11:
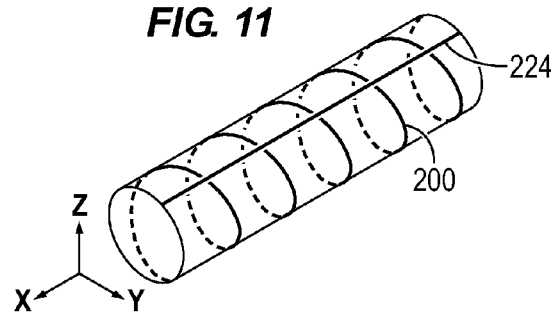
FIG. 11 is a schematic illustration of a fiber optic sensor with two exemplary fiber patterns, according to an embodiment.

In some embodiments, as shown in FIG. 11, a helically wound spiral sensor 200 can be combined with a straight fiber 224 that is sensitive to only the in-line component (e.g., X). In such embodiments, the response from the in-line fiber can be combined with the response from the helically wound fiber to obtain the transverse components (e.g., (Z+Y)) separately from the in-line component (e.g., X), as follows:

$$(X+Y+Z)-(X)=(Z+Y)$$

Figure 29:
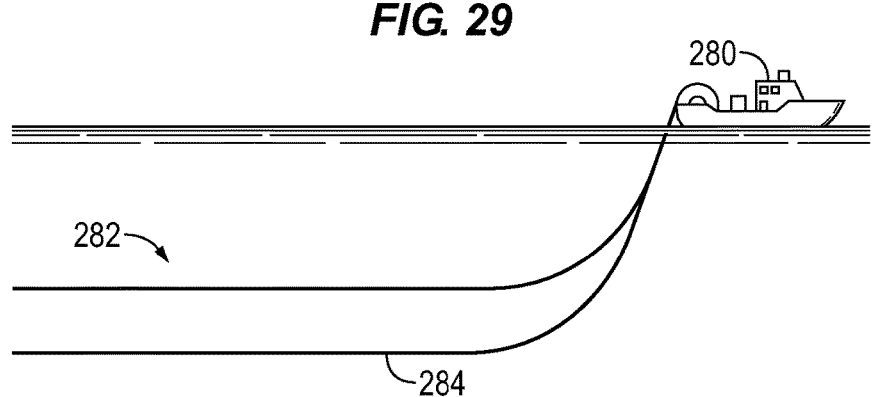
FIG. 29 is a schematic illustration of an exemplary fiber optic sensor towed in a marine streamer, according to an embodiment.

An exemplary application for such a configuration is in a seismic towing streamer, as shown in FIG. 29, which shows a ship 280 towing a streamer 282 that includes fiber optic sensor 284 that includes a plurality of fiber patterns that are arranged so that the velocity components of a monitored acoustic wavefield can be separated. In an exemplary embodiment, when used in a streamer, the combination of an in-line fiber with a spiral fiber can enable removal of the in-line propagating noise from the transverse components. Because the transverse components are typically dominated by the vertical Z component in marine applications, good quality Z component seismic signals can result from this configuration.

Further enhancements can be achieved by combining the in-line fiber and the spiral fiber with hydrophones that are arranged to provide a response to a pressure wavefield. The hydrophones in such an embodiment can be conventional hydrophone point sensors or can be a pressure sensor that is made with an optical fiber (e.g., a fiber wound about a mandrel). This configuration provides measurements that are indicative of pressure and predominantly the Z component of the velocity vector, thus providing for up/down (directional) separation of the measured wavefields.

Figure 12:
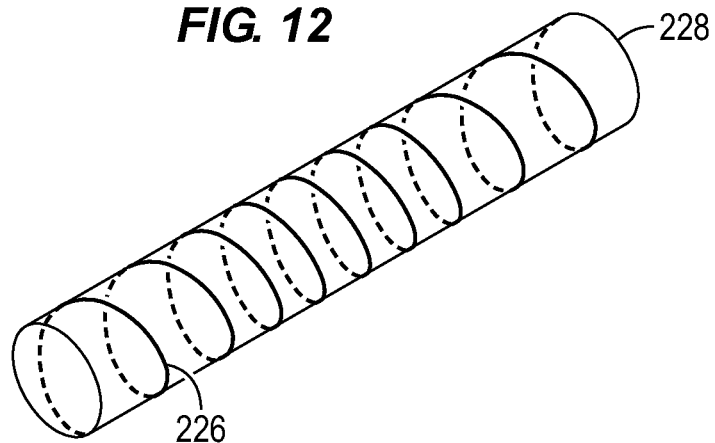
FIG. 12 is a schematic illustration of a fiber optic sensor with an exemplary fiber pattern, according to an embodiment.

As will be described in further detail below, the fact that the fiber sensor senses the seismic wavefield over a particular length has implications for its frequency response, through the wavenumber response of an acoustic wave arriving with a particular apparent velocity relative to the fiber dimensions. Although these effects can be altered using signal processing techniques, in some instances it is desirable to manipulate the frequency response in the sensing hardware instead and specifically through the disposition of the sensing fiber. To that end, as shown in the example of FIG. 12, the pitch (or lay angle for a helix) of an optical fiber 226 can be varied (i.e., modulated) along the length of a mandrel 228 so as to smooth the variations in the frequency response that can result from the wavenumber filtering effect.

To further illustrate the manner in which the advantages of patterned fiber sensors can be exploited, consider the manner in which phase-based heterodyne DVS (hDVS) systems operate. In such systems, the output is a phase comparison between the Rayleigh backscatter returned from closely separated sections of fiber, the distance between these sections being referred to here as the differentiation interval. It is that interval that dictates the spatial resolution of the system, in effect the gauge length of each resolvable portion of the fiber. The gauge length also dictates the wavenumber response of the sensor in the axial direction. The differentiation interval can be determined by the separation between pairs of interrogating pulses, the length of a section of fiber in an interferometer or in signal processing.

However, the information returned by the interrogating system can be sampled far more frequently than the differentiation interval. For example, the differentiation interval can be 10 meters, while the sampling interval is 1 meter.

In some configurations, the variation of the pitch of the helically wound fiber sensor (e.g., sensor 226) can be on a scale substantially smaller than the typical differentiation interval such that adjacent samples of the signal occupy somewhat different spatial lengths of the fiber. Any structure in the frequency response of the sensing system can then be smoothed, for example, by averaging a few neighboring samples.

For a fixed differentiation interval in the fiber, varying the pitch of a winding will modify the length of the sensor cable over which this interval is applied.

A similar effect can be achieved by modulating the size of the structure over which the fiber is wound or placed. For example, when a fiber is wound on a mandrel (e.g., mandrel 228), the diameter of that mandrel can be modulated along its length. In the case of a serpentine pattern, the depth of the displacement (in the transverse direction to the principal axis) can be varied, which will affect the frequency response in that dimension, while not necessarily varying it in the principal axis. In contrast, a change in the pitch of a serpentine pattern affects the frequency response in the principal axis.

In yet other embodiments, the form factor of the helix can be altered, so that the length of fiber in the Y direction is reduced, thus reducing the sensitivity of the sensor to the Y components. As another alternative, the helix can be replaced by a serpentine pattern that is orientated only in the vertical Z and in-line horizontal X planes. The combination with the X component from an in-line fiber provides a clean estimate of the Z component of the wavefield and a clean estimate of the X horizontal components.

Although any shape of the serpentine can provide a sensitivity to a transverse acoustic wave, a particularly useful serpentine pattern is one made of semi-circles that are flipped in the axial direction (as shown, for example, in FIG. 6). This arrangement ensures that there are equal fiber lengths in the principal axis and on the transverse dimensional components, thus providing equal sensitivity in the two axes (subject to the wavenumber filtering effects that will be described below).

Figure 13:
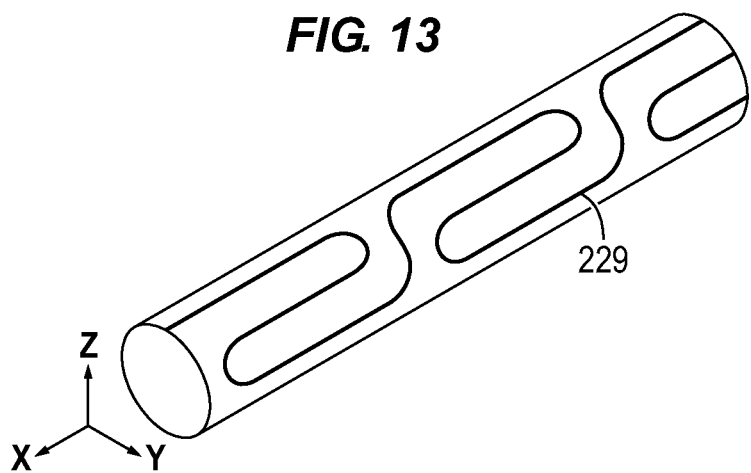
FIG. 13 is a schematic illustration of an exemplary fiber optic pattern, according to an embodiment.

The pattern of the serpentine can be arranged in any of a variety of configurations in order to alter the ratio of fiber laid in one dimension relative to other dimensions. For example, a pattern where the fiber reverses several times along one direction (rather like a Grecian frieze) can be used to vary the ratio of fiber between the major axes. Such a fiber pattern 229 is schematically illustrated in FIG. 13, where the pattern 229 moves in the Z-direction and then in the Y-direction. Simultaneously, this type of pattern can be used to place more fiber in a given unit of the cable or supporting structure and thus improve the spatial resolution of the system (with a trade-off in terms of a larger amount of fiber required to cover a given surveyed length).

Figure 14:
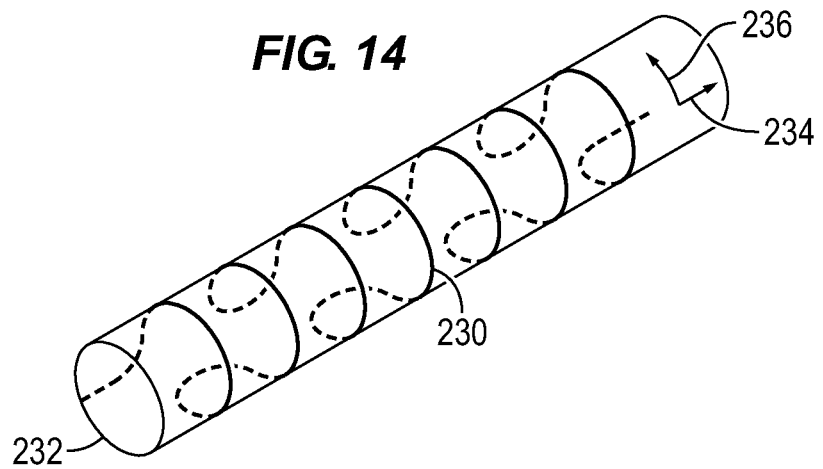
FIG. 14 is a schematic illustration of another fiber optic sensor with another exemplary fiber pattern, according to an embodiment.

As shown in the example of FIG. 14, a serpentine 230 can be applied to or wound on the side of a cable 232 (e.g., on the outer surface of the cable 232), for example a cylindrical cable, and provided that it occupies a non-integer half circumference, it will provide axial discrimination in the transverse direction (i.e., provide a different response for a seismic wave arriving at some azimuthal angles compared to other azimuthal angles). The serpentine fiber 230 in FIG. 14 has sensitivity to axial signals (in the direction of axis 234) and transverse signals (in the direction of axis 236), with more sensitivity in the transverse direction 236 than the axial direction 234. In some embodiments, a complementary serpentine having a different orientation (e.g., perpendicular to that shown in FIG. 14) can also be included in the cable 232 so as to provide discrimination between components in the two transverse directions, as discussed above.

In applications in which more than one fiber is used (e.g., for discriminating the signal on different axes as described above), one way of interrogating them is to attach each fiber to a different interrogation system. For instance, referring to FIG. 9, each sensor 214, 216, 218 can be coupled with a respective interrogation system 238, 240, 242. Alternatively, a single fiber can be looped back at one or more ends of the cable. In such embodiments (such as shown in FIG. 7), a single fiber follows several different paths along the cable, each pass through the cable providing additional information about the direction of the incident acoustic waves and/or providing information that alleviates insensitivity to particular directions. This can be achieved, for example, by winding each pass separately on the cable, continuously up and down the cable. As yet another alternative, the cable can be constructed with several different sections of fiber that are installed in a single direction in the cabling process and then connected or re-connected to each other at the end of the cable after manufacture.

Conveniently, at the locations where the fiber loops back in the cable, additional functionality can be provided. For example, an optical fiber amplifier can be included in the fiber path at the loop back location to boost the probe and/or backscatter signals. Such an amplifier can be powered by light carried at a separate wavelength in the same fiber or by yet another fiber.

Such configurations are particularly useful in seismic surveying applications.

These various spatial patterns can be combined in a manner that allows for separation of all three components of the incident wavefield. For instance, full three-component separation can be achieved using a helically wound fiber measuring (X+Y+Z) and two additional fibers, one in a serpentine or other two-dimensional planar pattern and distributed in the (X+Z) plane and the other in a serpentine of other two-dimensional planar pattern in the (X+Y) plane. Thus, the three components can be separated from the responses of the three patterns as follows:

$$(X+Y+Z)-(X+Z)=Y$$

$$(X+Y+Z)-(X+Y)=Z$$

$$(X+Z)+(X+Y)-(X+Y+Z)=X$$

Figure 15:
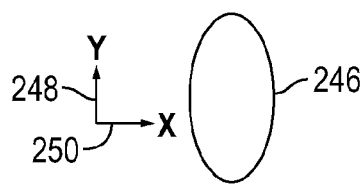
FIG. 15 is a schematic end view of another fiber optic sensor, according to an embodiment.
Figure 16:
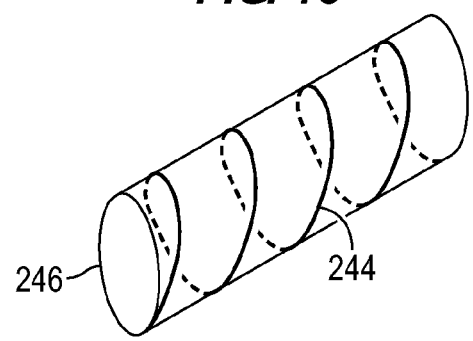
FIG. 16 is a schematic side illustration of the exemplary fiber optic sensor of FIG. 15.

As described above for the circular sensor embodiment, the form factors of a fiber wound in a helical shape could be altered arbitrarily, which could facilitate the manufacture of such a device. For instance, FIGS. 15 and 16 shown a fiber 244 helically wound on a mandrel 246 (FIG. 16) having an oblate cross section (as shown in FIG. 15). The mandrel 246 has a diameter along the Y-axis 248 that is twice that of its diameter in the X direction 250. The helical shapes can be wound into the oblate shape shown in FIGS. 15 and 16 with appropriate lay angles, so that three such fiber sensors would each be sensitive to: (2X+Y+Z), (X+2Y+Z), and (X+Y+2Z), assuming that the amount of the fiber per unit length in each of these cases along one axis is twice that of the other two axes. Again, three equations are formed with three unknowns, and each component can be separated from such measurements by the appropriate solution of their simultaneous equations governed by the sensor length ratio in each component direction of each sensor fiber. Again, the ratios can be arbitrary and generalized (as long as they are known) so as to improve sensitivity and dynamic range.

Where oblate shapes are used and all three axes are of interest, then more than one mandrel can be used. For example, the fiber sensors can be wound on two mandrels with the same oblate cross section, but with non-aligned (e.g., orthogonal) major axes. Alternatively, two mandrels with different aspect ratios in their cross-section can be provided.

Figure 17:
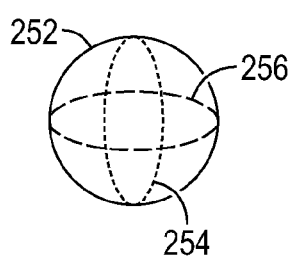
FIG. 17 is a schematic end view of another fiber optic sensor, according to an embodiment.
Figure 18:
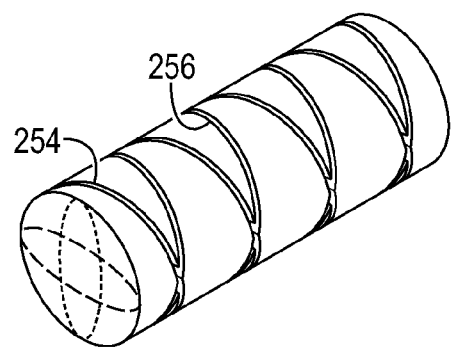
FIG. 18 is a schematic side illustration of the fiber optic sensor of FIG. 17.

In some cases where separation of all three components is desired, multiple mandrels may not be feasible. Further, in some instances, non-circular mandrels can hinder manufacturing processes, such as a subsequent process step where a coating is extruded over the fiber layer. In such cases, as shown in FIGS. 17 and 18, a mandrel 252 having a uniform outer shape (end view shown in FIG. 17) can have a groove of variable depth cut into it into which a fiber can be laid and, optionally, attached (e.g., with an adhesive). In one example, a mandrel 252 of circular cross-section can have two grooves 254, 256 cut into it, each groove being shallow on one axis and deep on the other axis. Further, the grooves 254, 256 are arranged such that their deep axes are not co-linear. For instance, the deep axes of the grooves 254, 256 can be orthogonal. The grooves 254, 256 can be configured so that where they cross, one groove is deeper than the other by at least one fiber diameter to minimize microbending losses. The fibers are wound in turn into these grooves 254, 256. A third fiber, either straight or wound onto yet another cross-section (e.g., circular) can provide the additional independent information to enable a three-component wavefield separation as discussed above.

Any of the above described velocity directional sensitive patterns can be combined with pressure measurements from either conventional hydrophones or fiber optic hydrophones to achieve waveform separations from the combination of pressure and X, Y, Z velocity measurements.

In the construction of a sensing cable according to the foregoing descriptions, coupling between the substrate and the sensing fiber can be provided, for example, by filling voids with a gel or a settable rubber. However, the manufacturing process also can be designed to allow the cable to accommodate large changes in its length caused, for example, by axial strain, bending or torsion. To accommodate for this contingency, a material, such as a gel, can be used that allows the fiber to slip if a certain strain level is exceeded. In addition, excess fiber can be left at regular intervals along the cable that are loosely coupled and can provide excess fiber or allow fiber that is excessive in other regions of the cable to be accepted without buckling.

Yet further, certain layouts of the fiber can be used that favor resilience to bending and torsion. As one example, a helical wind with some slippage allowed is resilient to bending, and it also reduces the effect of axial strain of the cable on the fiber. However, this configuration does not protect against torsion, which can be a concern in either wireline or marine seismic streamer deployment where the cables typically are not perfectly torque balanced (so that a strain on the cable typically results in torque). Similarly, control surfaces that are used to steer towed streamers often impart torsion to the streamer in order to exercise a lateral force at the angle required to correct the streamer shape and position. When the sensing cable is used in such applications, an "S-Z" winding can be used, where a helical wind is reversed periodically. Such a winding layout still offers the same directionality as a helix, but the periodic reversals of the direction of the helix can improve resilience against torsion.

Figure 19:
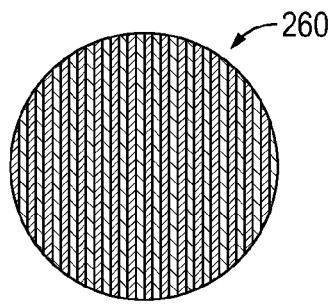
FIG. 19 is a schematic illustration of an exemplary mandrel having a laminate structure having different compliances, according to an embodiment.

In a three-dimensional structure, such as a helically wound fiber over a mandrel, an asymmetric response can be obtained as discussed above by using a non-circular cross-section. In other embodiments, an asymmetric response can be achieved by using asymmetric compliance in the material forming the mandrel. Thus, for example, if the mandrel were made from a material having a laminated structure alternating high and low modulus materials in a particular axis, then a differential compliance can be achieved. An example of such a laminated structure of a mandrel 260 is schematically illustrated in the cross-sectional view of FIG. 19.

Figure 20:
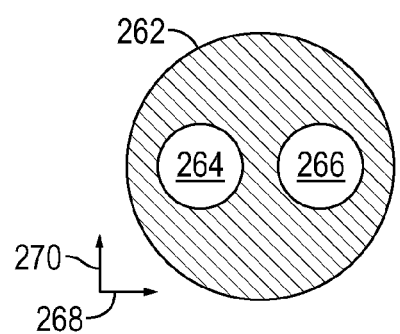
FIG. 20 is a schematic illustration of an exemplary mandrel with asymmetric compliance along different axes, according to an embodiment.

In yet other embodiments, the mandrel can include sections that are more compressible than other sections. For example, FIG. 20 schematically illustrates a cross section of a mandrel 262 that is configured as a solid cylinder with a pair of holes 264, 266 positioned on a diameter of the mandrel 262 on either side off center along axis 268. This configuration yields a compliance that is far higher along axis 268 than on the orthogonal axis 270. In this manner, the asymmetry in compliance is modified and an asymmetric compliance achieved even in a circular cross-section. As a further option, the symmetry of the bending stiffness can be adjusted by inclusion of strain members that have little effect on lateral compliance, but which increase the bending stiffness.

In various embodiments, multiple mandrels with asymmetric compliance can be used. In such embodiments, each mandrel has at least one fiber wound thereon, and the axes of asymmetric compliance of the mandrels are oriented non-colinearly (e.g., orthogonally) with respect to each other. Combinations of symmetric and asymmetric mandrels also can provide for three-component discrimination of the acoustic wavefield.

In general, for a buried sensing cable, the compliance of the mandrel should be greater than or equal to that of the surrounding material to which the sensing cable is coupled.

Up/down wave separation has been discussed, along with the desirability for a response that relates to pressure rather than to particle velocity. With this in mind, one or more of the fiber sensors described above can be made from a fiber having a differential response to pressure on orthogonal axes. Fibers that have this property are well known and include, for example, side-hole fibers. Other fiber structures with pressure-sensitive birefringence are also well known and can be used to produce a common-mode signal having properties similar to those discussed above. Alternatively, an additional fiber can be wound on a compliant mandrel to provide a signal primarily related to pressure, as is known in the design of fiber-optic hydrophones.

Wavenumber Responses of Distributed Vibration Sensors

As described above, a distributed fiber sensor is sensitive to velocity over the length of the fiber and in-line with the fiber's direction. A DVS sensor also has a wavenumber response in the direction of the fiber.

Figure 21:
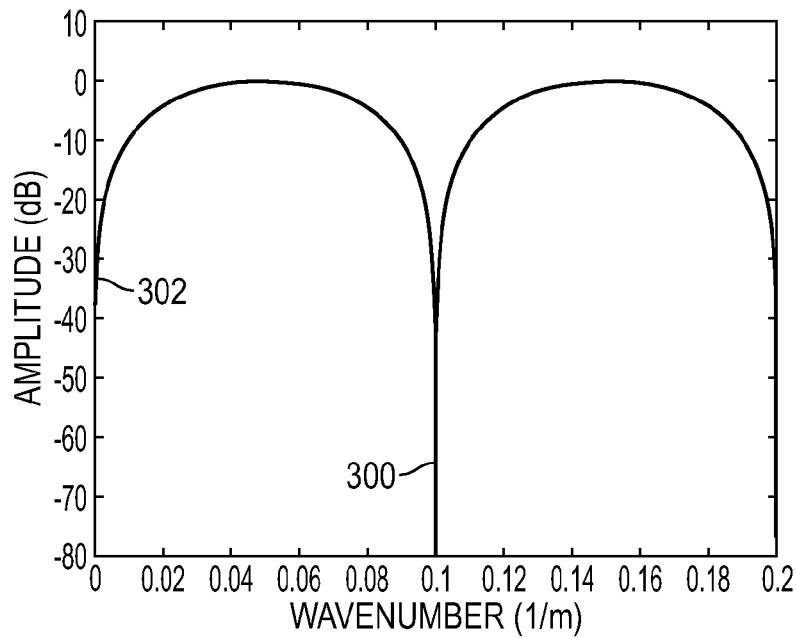
FIG. 21 is a plot of a wavenumber response of an exemplary fiber optic sensor.

A linear distributed fiber optic sensor with a length of 10 meters has a wavenumber response to incident acoustic signals as shown in FIG. 21, which is a graph illustrating amplitude (decibels (dB)) on the vertical axis and wavenumber (1/m) on the horizontal axis. Such a sensor has a notch 300 at a wavenumber of $\frac{1}{10}$ meter=0.1 $m^{-1}$. The notch 300 also wraps around to 0 $m^{-1}$ wavenumber. The wavenumber response of the DVS sensor is an important characteristic. Such a sensor's response to an incident seismic signal is dependent on the angle of incidence the incoming seismic signal has to the orientation of the fiber.

Figure 22:
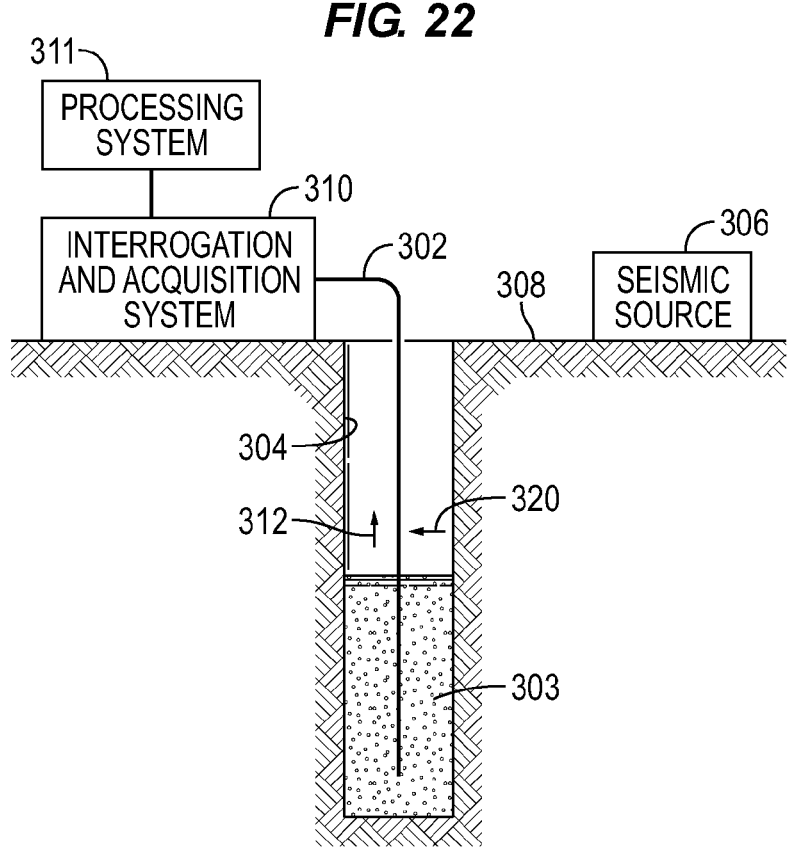
FIG. 22 is a schematic illustration of an exemplary fiber optic sensor deployed in a wellbore, according to an embodiment.

When used for vertical seismic profiling (e.g., in a vertical wellbore), a fiber 302 is orientated vertically in a borehole 304 and a source of seismic energy 306 is typically at the surface 308. An example of such an application is shown in FIG. 22. The fiber sensor 302 is connected to an appropriate interrogation and acquisition system 310 to obtain measurements indicative of the response of the sensor 302 to an incident acoustic wavefield. The interrogation and acquisition system 310 can be communicatively coupled with a processing system 311 so that the information acquired by the acquisition unit 310 can be processed to determine, for instance, the separate velocity components of the monitored acoustic wavefield. The processing system 311 can be in the same location as the other components of the system 310, or can be remote from the system 310. The information generated by the acquisition system 310 can be processed by system 311 in real time or near real time, or the information can be stored in a storage device (not shown) and processed at a later time.

Either or both of the acquisition system 310 and the processing system 311 can include respective processing devices (e.g., general purpose processor, microcontroller, etc.) for processing the DVS data and determining directional components therefrom. Instructions for performing the processing can be stored on any computer readable medium, memory or other storage device.

Figure 23:
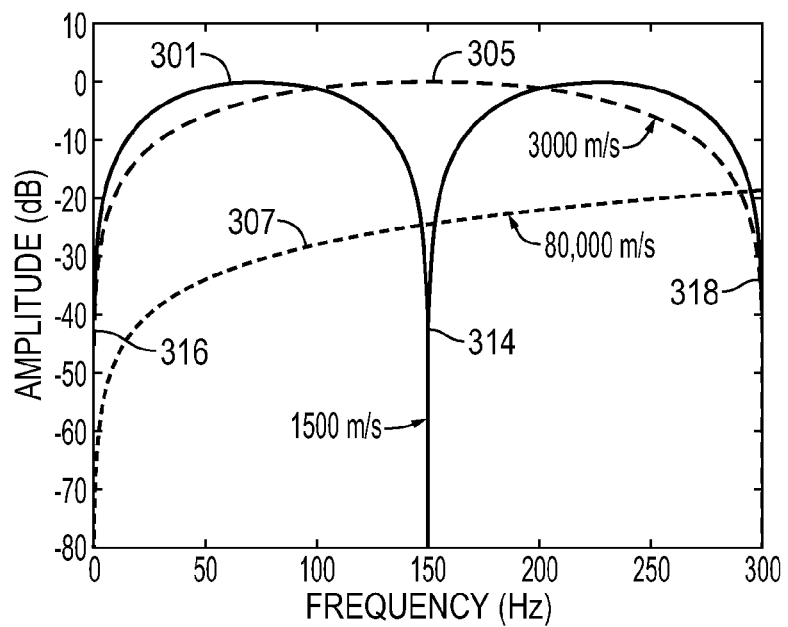
FIG. 23 is a plot of a wavenumber response of an exemplary composite fiber optic sensor, according to an embodiment.

In such applications, the fiber sensor's 302 response to the incoming seismic signal for a range of apparent velocities (angle of incidence) at the fiber 302 is illustrated in FIG. 23 and represented by trace 301.

For acoustic energy propagating in the vertical direction 312, in-line with the fiber 302 in the fluid 303 (typically water) in the borehole 304, the 10 meter long fiber sensor wavenumber response notch maps to a notch 314 in the frequency domain for this apparent velocity arrival at 150 Hz. FIG. 23 also shows that there is a loss of sensitivity to the incoming seismic signal at the zero wavenumber notch 316, which maps to 0 Hz in the frequency domain.

For a typical seismic arrival that propagates through the rock medium from the source 306 to the sensor 302 from a non-vertical angle of incidence with an apparent velocity of 3000 meters/second (m/s), the response is shown by the line 305 of FIG. 23. FIG. 23 plots amplitude (dB) on the vertical axis and frequency (Hz) on the horizontal axis. The 0.1 $m^{-1}$ wavenumber notch 318 now maps to 300 Hz in the frequency domain for this arrival. The zero wavenumber notch slope is emphasized and such arrivals are more deficient of low frequency energy than for the acoustic signal propagating in the vertical direction 312 or in the borehole fluid 303 (which typically is aligned with the borehole 304).

For a seismic signal imparted into the earth at a distant offset from the borehole 304, the arrival comes in to the vertical fiber sensor 302 from an almost broadside direction 320. The response of sensor 302 to this seismic signal is approximated by line 307 in FIG. 23. This arrival is very deficient of low and mid frequency energy, and the fiber 302 is quite insensitive to such broadside arrivals. Such a response is explained by the fact that such broadside signals arrive along the length of the fiber 302 at the same time and thus do not impart a stretch or compression of the fiber length.

An alternative way to consider the wavenumber response of the fiber optic sensor and how it affects the spectral sensitivity of an impinging elastic wave, is to look at a frequency-wavenumber spectrum.

The wavenumber response of the 10 m long fiber optic sensor in this example is a fixed filter with notches at k=0, k=0.1, . . . , k=(n×0.1), when n is an integer, up to the spatial Nyquist of the filter (in this case, k=2.0). The wavenumber response is frequency invariant. And the notches of the sensor's wavenumber response are vertically orientated in the FK spectrum. An elastic signal propagating broadside to the fiber sensor 302 will have an apparent velocity of infinity and will fall completely into the notch at k=0 $m^{-1}$, and will not be recorded by the sensor 302, as discussed earlier. Those frequencies in the signal that fall into the wavenumber notches will be highly attenuated and the signal will have a severely notchy spectrum. The wavenumber notches will map to different frequencies for elastic signals that arrive at the sensor with different apparent velocities.

If a fiber optic sensor of a different length is used, its notches will map to different wavenumbers and hence to frequencies that are different than those for a 10 m long sensor, depending on the elastic signal's angle of incidence (or apparent velocity) at the fiber optic sensor.

The use of the helically wound or other three-dimensional pattern of fiber distribution in an optical fiber sensor cable as discussed earlier can solve the wavenumber notch issue. When such a cable is used, the X and Y components would be sensitive to the broadside propagating signal if the in-line (vertical) orientation of the sensing fiber is in the vertical Z direction.

All of the generalized combinations of fiber distribution patterns described above would also solve the issue of directional sensitivity.

One issue of using helically wound fibers as multi-component fiber optic sensors is that the sensor length in the in-line direction is physically longer than the dimension (the diameter) for the two cross-line components. For instance, if we choose to use an in-line sensor length of 10 m, the two cross-line components will only have a physical extent equal to the diameter of the cable, which may be 0.05 m (or 5 cm), despite the same length of fiber being distributed equally in all three components along the length of the helically wound sensing cable. The wavenumber responses of the in-line component will be very different from the smaller two cross-line components. A small dimensional sensor of, for example, 0.05 m will have a broadband wavenumber sensitivity that will have its first notch at k=20 $m^{-1}$. While the notch spacing will be very large when compared to the notch spacing for a 10 m long sensor (in-line direction) of every 0.1 $m^{-1}$, the sensitivity of the 0.05 m long components will be limited. This is illustrated in FIG. 24, which plots amplitude (radians) on the vertical axis and time (seconds) on the horizontal axis.

Figure 24:
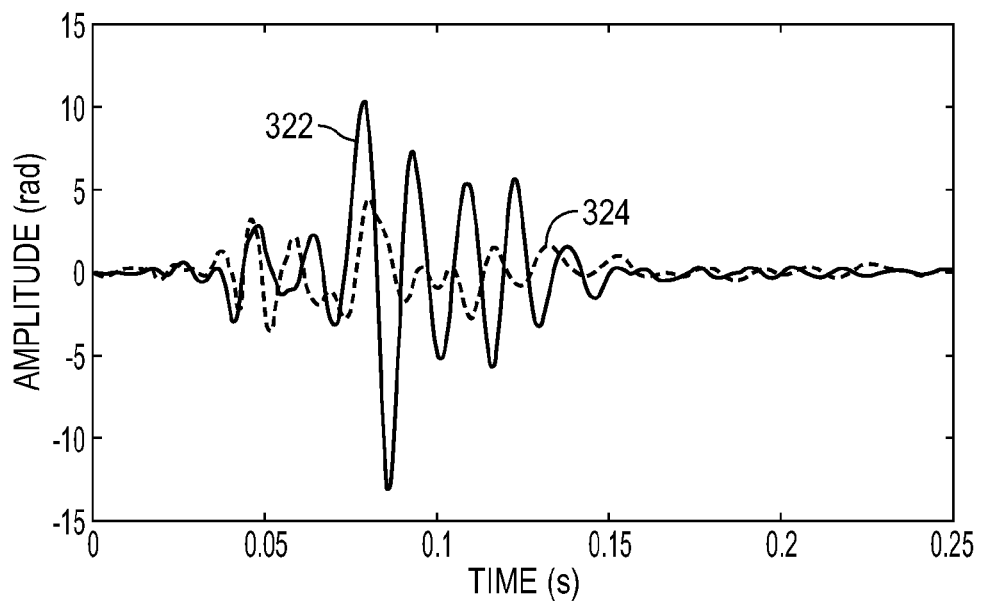
FIG. 24 is a response of a helically wound fiber optic sensor to an acoustic wavefield.

FIG. 24 shows a response 322 of the same helically wound fiber optic sensor for a shot fired in-line with the length of the sensor and a response 324 for a shot fired perpendicular to the orientation of the fiber. The surface wave arrivals between 0.07-0.14 s are stronger for the in-line shot when compared to the perpendicular shot. In this example, the in-line length of the sensor was about 1.0 m while the diameter of the sensor was around 0.03 m. The surface wave energy is recorded along the 1.0 m sensor length for the in-line shot (trace 322), but only across a sensor length of 0.03 m for the perpendicular shot (trace 324). While there is the same cumulative length of fiber in each of the three orthogonal dimensions within the helical structure and the in-line component has a different wavenumber response to the two cross-cable components, the signal-to-noise ratio between all three components will be similar.

So, while a helically wound fiber optic sensor is sensitive to signals from all three mutually orthogonal directions, it has different wavenumber responses between the in-line direction and the two cross-line directions. These differences should be corrected if a helically wound fiber optic sensor is to have an equivalent response to that of a three-component moving coil geophone sensor array. As the diameter, and hence the dimensions of the cross-cable components, is small so as to gain access to a borehole or for streamer use in either towed marine seismic surveying or seafloor multi-component seismic surveying, there is limited opportunity to form composite sensor configurations with different dimensions that could otherwise correct for the different wavenumber responses in the different directions.

These same issues apply both to helical patterns and other fiber sensor patterns where the dimensions in the orthogonal directions are different. For instance, a helical pattern with asymmetric winding in the two orthogonal cross-line components also will have different wavenumber responses in the different directions.

Accordingly, embodiments described herein are configured to address these issues. In one embodiment, an inverse filter is derived and applied to compensate for the known wavenumber response of the fiber optic sensor, as will be discussed in further detail below.

Other embodiments are particularly applicable to single, straight fiber sensors. For instance, one embodiment uses the fact that a fiber sensor has a wavenumber response determined by the effective sensor length. Thus, in this embodiment, the raw data obtained from a fiber optic sensor in a hDVS system can be processed multiple times to mimic optical fiber sensors of different lengths by selecting appropriate fiber intervals (differentiation intervals) over which the phase difference is estimated. An example of an hDVS system is described in U.S. Patent Application No. 2012/0067118A1. To illustrate, a long fiber sensor with a length, for example, of 50 m would have a first wavenumber notch at 1/50=0.02 m$^{-1}$. Such a sensor has much greater sensitivity to the low frequency signals from the seismic signals.

Thus, a combination of measurements from DVS sensors of different lengths can diminish the impact of notches, as one sensor can provide measurements at those wavenumbers where notches are present for other sensor lengths. The number and lengths of the sensors can be optimized for the application. The longer sensor (e.g., 50 m) can provide only the low frequencies, a medium length sensor (e.g., 10 m) can provide low to intermediate frequencies, and the higher frequencies can be provided by a short sensor length (e.g., 4 m). In some embodiments, different sensor lengths are achieved by using multiple physical sensors. In other embodiment, different sensor lengths can be achieved through data processing as described above, where multiple different differentiation intervals over which phase difference is estimated are applied to a data set acquired from a distributed fiber optic vibration sensor. In such embodiments, each different differentiation interval corresponds to a different sensor length.

The signal extracted when using the DVS technology is the difference of the phase between two points of measurement along the fiber, which is equivalent to computing the first-order derivative approximation between these two points. The points of measurement need not be adjacent, but can be any interval along the length of the fiber over which it is desired to determine the phase difference. When the phase computation along the fiber is corrupted by instrument noise (signal power below the random instrument noise) or by fading-related issues, the first-order derivative computed over only two points (second-order accuracy) can be replaced by a first-order derivative computed over more points of measurement along the fiber yielding a more robust result. The general formula for the computation of first-order derivative in point x with arbitrary order of accuracy is: $f'(x)=\Sigma_a w_a [f(x+ah)-f(x-ah)]$, where a=1, . . . , n is the order of accuracy, $w_a$ are the multiplicative coefficients given a the order of accuracy a, and h is the distance between measurement points. For second-order of accuracy $w_a=\frac{1}{2}$, for fourth-order of accuracy $w_a=[\frac{2}{3}, -\frac{1}{12}]$, and so on.

Further improvements in signal fidelity in the data processing techniques described above can be achieved by using either a 1D or FK (frequency-wavenumber) whitening deconvolution.

Figure 25A:
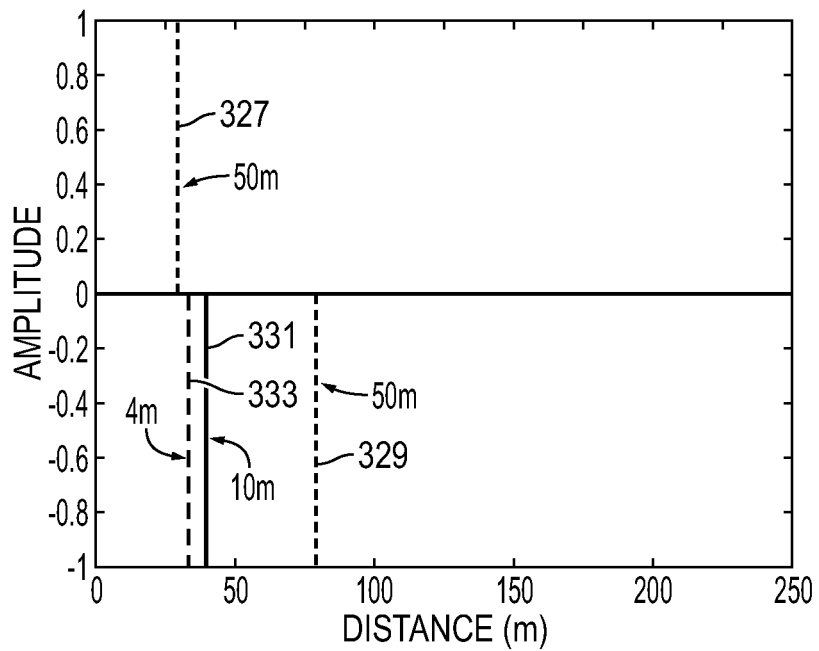
FIG. 25A is a plot of the response of an exemplary composite fiber optic sensor, according to an embodiment.
Figure 25B:
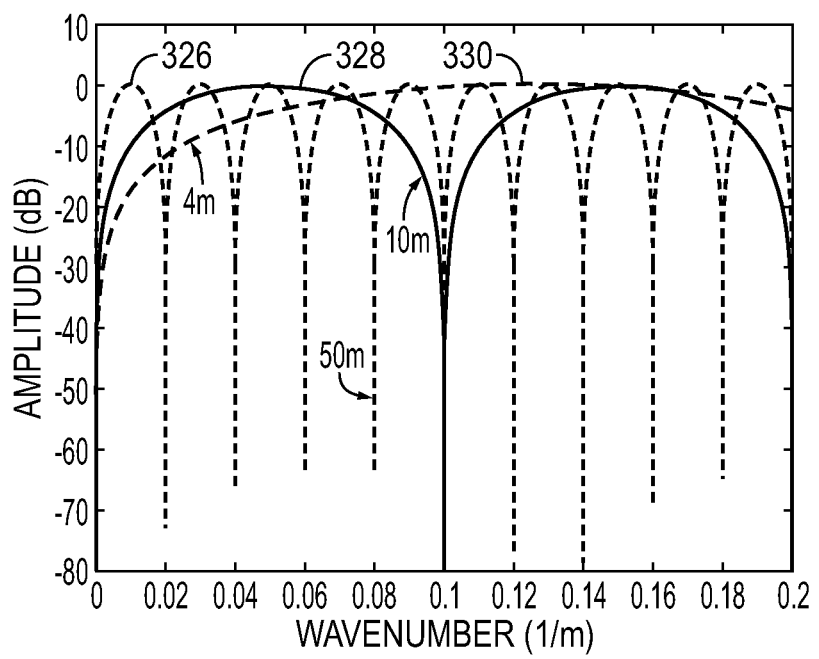
FIG. 25B is a plot of a wavenumber response of the exemplary composite fiber optic sensor of FIG. 25A, according to an embodiment.

The response of a composite sensor that includes three sensors of different lengths (e.g., 4 meters, 10 meters, and 50 meters) is illustrated in FIGS. 25A and 25B. FIG. 25A plots the amplitude (dB) of the fiber sensor response on the vertical axis and distance (m) on the horizontal axis. FIG. 25B plots amplitude (dB) of the fiber sensor wavenumber spectrum response on the vertical axis and wavenumber (1/m) on the horizontal axis. In FIG. 25A, the response of the longest (e.g., 50 m) sensor is represented by traces 327, 329; the response of the intermediate (e.g., 10 m) sensor is represented by trace 331; and the response of the shortest (e.g., 4 m) is represented by trace 333. In FIG. 25B, the wavenumber spectrum response of the longest sensor (e.g., 50 m) is represented by trace 326, the response of the intermediate length (e.g., 10 m) sensor by trace 328, and the response of the short length sensor (e.g., 4 m) by the trace 330. In this example of a composite sensor, the wavenumber responses are selected to mutually fill the wavenumber notches.

Yet further improvements can be obtained by selecting effective sensor lengths that do not have nearly coincident notches in their wavenumber responses. For instance, the selected sensor lengths can be in mutually prime number ratios, ensuring that no notches from the multiple filter lengths would coincide in the wavenumber domain. Another alternative is to use a sensor that has a spiral shape, such that the effective sensor length is different, thus providing different frequency sensitivities, to avoid notches in the wavenumber response. Such a combination of signals from multiple sensor lengths can provide a broadband seismic sensor response. However, while the long sensor can provide much low frequency information, it cannot fully fill the notch at 0 wavenumber (which maps onto 0 Hz with the frequency domain). This limitation has little impact, as most seismic sources are relatively deficient of low frequency signals.

Figure 30:
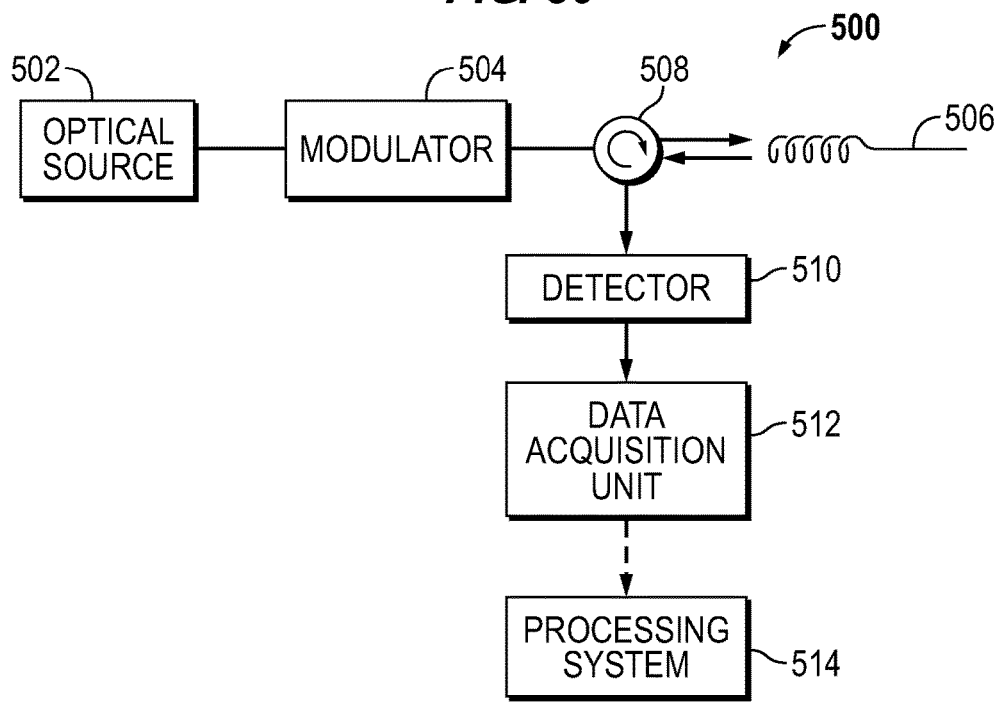
FIG. 30 is a block diagram of an exemplary distributed fiber optic vibration sensing system, according to an embodiment.

Although the technique of processing different seismic frequencies with appropriate differentiation intervals has been described in terms of a digital signal processing approach, it can also be applied to systems where the differentiation is effected in the hardware. For instance, in an exemplary embodiment shown in FIG. 30, a DVS system 500 can include an optical source 502 (e.g., a laser) to generate a narrowband optical signal. The optical source 502 can be coupled to a modulator 504 that is programmed, for instance, to launch pairs of optical pulses into a distributed fiber optic sensor 506 through a circulator or directional coupler 508. Each pulse in the pair of pulses is separated by the time delay that corresponds to a differentiation interval and each of the pulses can have a different optical carrier frequency.

The backscatter light generated by the fiber 506 passes through the coupler 508 and is detected by an optical detector 510 and then converted into an electrical signal. The electrical signals that emerge from the detector 510 are then processed by a data acquisition unit 512, which extracts the desired information (e.g., differential phase) from the electrical signal to form a data set (e.g., a digitized data set). The data set acquired by the acquisition unit 512 can then be passed to a processing system 514, which then processes the information to generate, for instance, a composite response of the distributed fiber optic sensor 506. The acquisition unit 512 and the processing system 514 can include respective processing devices (e.g., general purpose processor, microcontroller, etc.) for processing the data and generating the response of the sensor 506. The acquired data sets and the instructions for performing the processing can be stored on any computer readable medium, memory or other storage device.

In some exemplary embodiments, the detector 510 detects the optical power in the backscatter signals. The electrical signal representing the optical power can then be digitized and processed by the acquisition unit 512 to obtain differential phase. In other exemplary embodiments, the detector 510 detects the beat frequency of the two backscatter signals that are generated by the fiber 506 in response to the pair of interrogating pulses. In such embodiments, the backscatter signals mix at the detector 510 at their beat frequency. The signal representing the beat frequency can be digitized and processed by the acquisition unit 512 to extract the differential phase information.

Regardless of the specific technique implemented to detect and extract the differential phase information, by configuring the optical source 502 and modulator 504 so that they generate different time delays between pulses in a pair, the system 500 achieves multiple distinct differentiation intervals through its interrogation technique rather than in signal processing. In such a system, multiple data sets are acquired by the acquisition unit 512 for each of the distinct differentiation intervals. The processing system 514 can determine a response of the distributed fiber optic sensor 506 from each data set, where each response has a distinct wavenumber sensitivity that is defined by the differentiation interval (in this case, the time delay between pulses) used to acquire the data set. The responses can then be combined to form a composite response where one or more of the wavenumber notches in an individual response is (are) filled by data from one or more other response(s).

Figure 31:
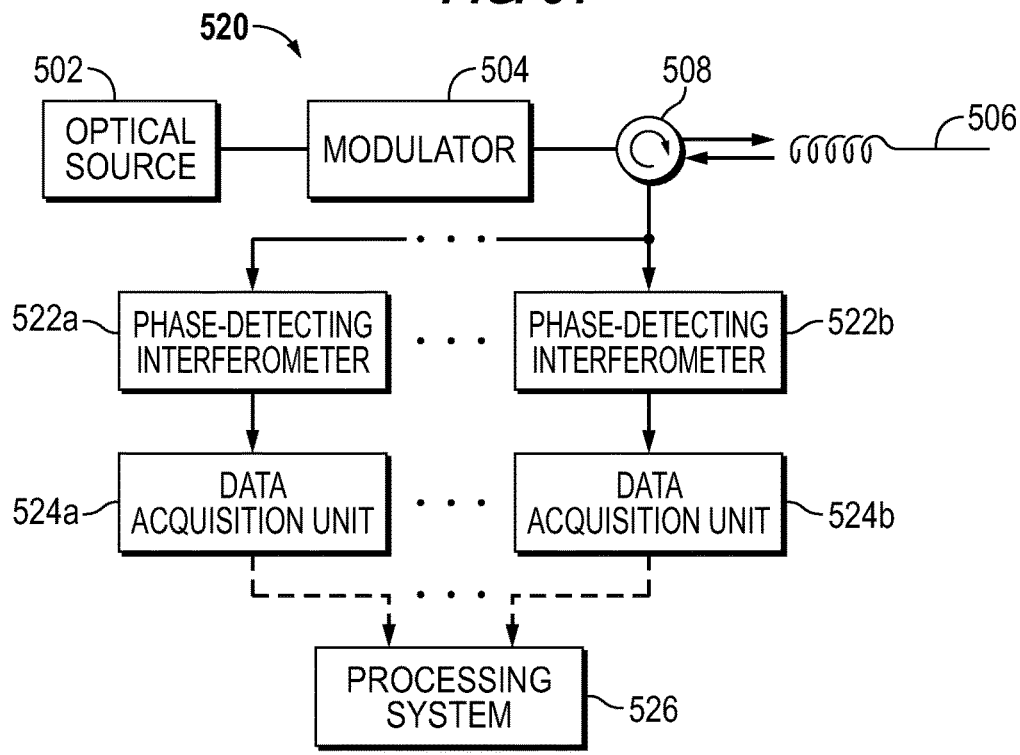
FIG. 31 is a block diagram of another exemplary distributed fiber optic vibration sensing system, according to an embodiment.

In another embodiment, distinct differentiation intervals are implemented in the interrogation and data acquisition hardware by implementing multiple phase-detecting interferometers, each interferometer having a different path imbalance. For instance, as shown in FIG. 31, a system 520 includes the optical source 502 and modulator 504 that launch optical pulses into the distributed fiber optic sensor 506 through the directional coupler 508. The backscatter optical signals generated by the fiber 506 are received by phase-detecting interferometers 522a and 522b through the coupler 508. In this example, each interferometer 522a, 522b has a different path imbalance, which can be implemented by using different physical lengths of optical fiber to create a path imbalance in the interferometer. In this embodiment, each distinct path imbalance corresponds to a distinct differentiation interval. Although only two phase-detecting interferometers 522 are shown, it should be understood that more than two interferometers can be implemented in the system 520.

The interferometers 522 can be configured in any of a variety of manners known to those of skill in the art. For example, each interferometer 522 can split the backscatter signals into two paths and then re-combine the split signals so that one is delayed relative to the other signal. The output of the interferometer 522 can then be normalized to provide a measure of the relative phase of the two backscatter signals. In some embodiments, the interferometer 522 can include a frequency-shifting circuit in order to convert a quasi-dc phase shift (that is measured using interferometer outputs with diverse phases, such as quadrature or 120° phase separations) into a time-varying phase shift that can be estimated from the time-dependence of the resulting beat frequency between backscatter signals shifted by different frequencies (one of which can be zero frequency).

Regardless of the configuration of the interferometer 522, in system 520, multiple data sets can be acquired by respective data acquisition units 524a, 524b coupled to interferometers 522a, 522b. The data acquisition units 524 can be configured in a known manner as is appropriate to acquire data corresponding to phase differences in the backscatter signal detected by the phase-detecting interferometers 522. The data sets acquired by the units 524 can then be passed to a processing system 526. The processing system can determine a response of the distributed fiber optic sensor 506 from each data set, where each response has a distinct wavenumber sensitivity that is defined by the path imbalance of the corresponding phase-detecting interferometer 522. The responses can then be combined to generate a composite response for the distributed fiber optic sensor where one or more of the wavenumber notches of an individual response is (are) filled by data from one or more other response(s).

Again, the data acquisition units 524 and the processing system 526 can include respective processing devices (e.g., general purpose processor, microcontroller, etc.) for processing the data and generating the response of the sensor 506. The acquired data sets and the instructions for performing the processing can be stored on any computer readable medium, memory or other storage device.

Figure 26A:
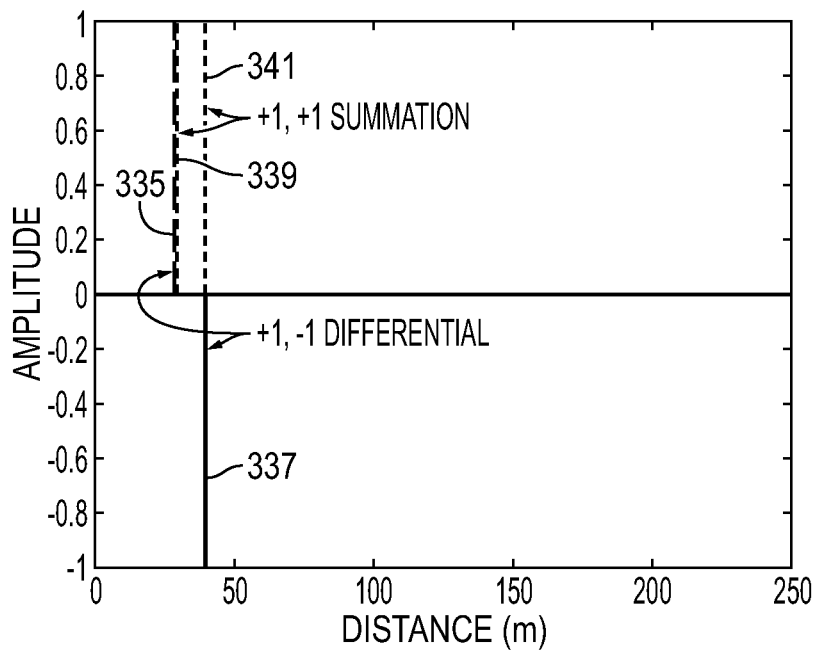
FIG. 26A is a plot of the response of an exemplary distributed fiber optic sensor, according to an embodiment.
Figure 26B:
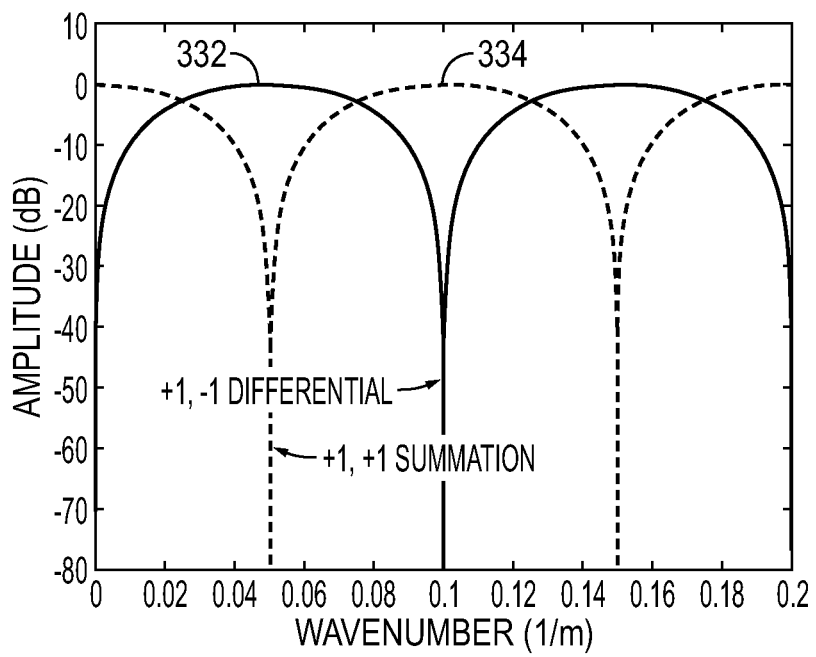
FIG. 26B is a plot of a wavenumber response of the exemplary distributed fiber optic sensor of FIG. 26A, according to an embodiment.

In alternative embodiments, all of the notches, including the notch at 0 wavenumber, can be filled. Generally speaking, the hDVS system obtains a differential measurement between two points at each end of the sensor length. It can be thought of as a (+1,−1) filter. The (+1,−1) differential filter obtained from raw fiber optic sensor data for a 10 m sensor is represented by traces 335, 337 in FIG. 26A, which plots amplitude (from +1 to −1) on the vertical axis and distance (m) on the horizontal axis. If the fiber sensor data obtained by the hDVS system are also integrated over their length to form a (+1,+1) filter (as represented by traces 339, 341 in FIG. 26A), then notches from this pre-processing route coincide with the peaks from the (+1,−1) filter and vice versa. Thus, by combining the signals from the standard (+1,−1) filter processing done with the hDVS system with the integration of the fiber optic data along the length of the sensor (the (+1,+1) filter), the resulting signal will have no notches. Even the 0 wavenumber notch will be filled in terms of the sensor's spectral response as shown in FIG. 26B, which plots amplitude (dB) of the wavenumber spectrum response of the 10 m sensor on the vertical axis and wavenumber (1/m) on the horizontal axis. In FIG. 26B, the trace 332 represents the wavenumber response using the (+1,−1) differential filter of the hDVS measurement, and the trace 334 represents the wavenumber response using the (+1,+1) inverse filter obtained from integrating the hDVS data.

Fiber Optic Sensor Response Inverse Filtering

An ideal seismic/acoustic sensor has a flat spectral response for all frequencies that it is designed to measure. The discussion above has shown that a distributed fiber sensor's response is dominated by its wavenumber response and how that affects the frequency spectral content of the recorded signals arriving at the sensor with different arrival angles or apparent velocities.

In each of the examples discussed, the wavenumber response of the sensor can be calculated: it is deterministic. If a scheme is used where the notches from one sensor are filled with measurements obtained from another sensor, or if measurements are taken using a multi-dimensional fiber sensor (e.g., a helically wound sensor), then a deterministic inverse (composite) wavenumber filter can be calculated that can then be applied to the recorded data to effectively flatten the spectral response of the composite fiber optic sensors.

The inverse filter can be applied in either a 2D or 3D form to take into account the arrival angle of acoustic events at the sensor. The 2D FK (frequency-wavenumber), Tau-p, Radon, FX (frequency-space) domains can provide appropriate domains for the application of such filters. Other 2D domains also are applicable. Similar extensions to 3D domains are suitable to apply the correction in 3D (e.g., $FK_xK_y$).

Figure 27:
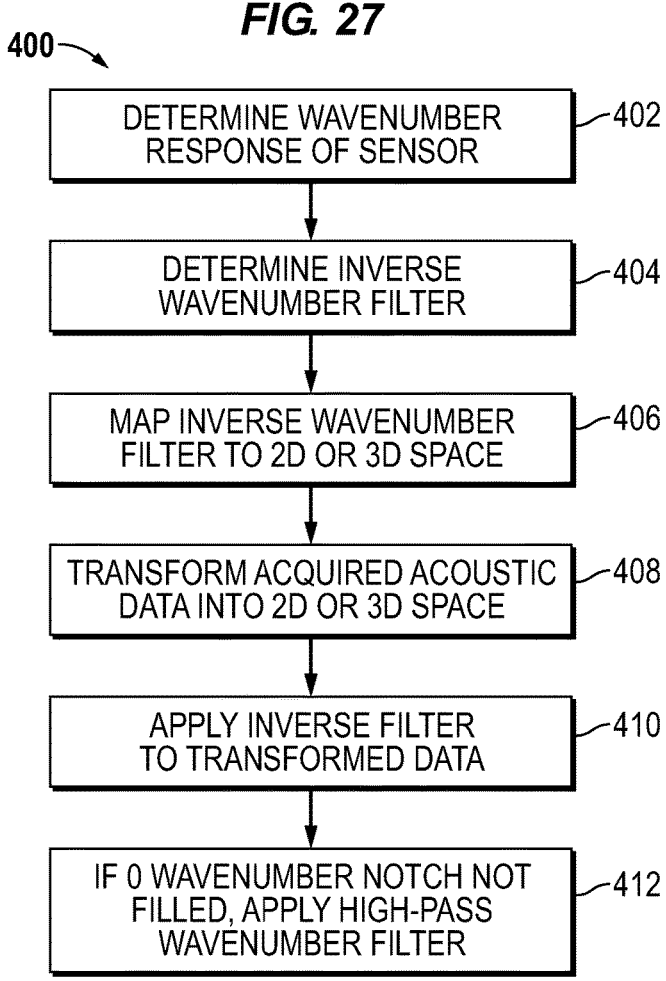
FIG. 27 is an exemplary flow diagram of a technique for filling wavenumber notches of a distributed fiber optic sensor, according to an embodiment.

A scheme 400 for the application of the inverse fiber optic sensor sensitivity filter is shown in FIG. 27. In block 402, the wavenumber response of the fiber optic sensor is calculated. Alternatively, the wavenumber response of the composite fiber optic sensor is calculated (if multiple sensor lengths are superimposed on one another as discussed above).

In block 404, an inverse wavenumber filter is calculated, such that its application to the wavenumber response determined in block 402 is flat across all wavenumbers.

In block 406, the inverse wavenumber filter is mapped into either 2D space or 3D space as appropriate, e.g., using either an FK or an $FK_xK_y$ transform.

In block 408, the recorded acoustic/seismic data is transformed into either the 2D or 3D space as appropriate. In block 410, the inverse filter is applied to the transformed data. In block 412, if the 0 wavenumber notch has not been filled by a useful signal from block 410, a high pass wavenumber filter is applied at a wavenumber close to $0\ m^{-1}$ so as to avoid noise near the zero wavenumber notch being amplified by the inverse wavenumber filter and contaminating the transformed data. Alternatively, a highpass frequency filter can be applied to the inverse filtered data for the same purpose.

The resulting data will then have been transformed, such that the fiber optic sensors used to record the data will have a flat response across its wavenumber response and hence the frequency response of the data.

The foregoing discussion has shown that a distributed fiber sensor has a response that matches well with velocity (temporal derivative of displacement) measurements integrated over the gauge-length of the fiber, and in-line with the fiber's direction. Moreover, depending on the type of interrogation unit used to interrogate the fiber, the response of the fiber can be different. Other experiments have shown that the fiber's response is very similar to strain (spatial difference of displacements) integrated over the gauge-length of the fiber. Once the character of the fiber's response is understood in this manner, then an accurate inverse transform can be derived that can be used to convert data obtained from the distributed fiber to be converted into a form that aids comparison (and eventually processing) with legacy geophone data.

This knowledge of the fiber's response also can be leveraged to provide for numerical modelling of the fiber data. This can be achieved, for example, by using the wave equation to compute strain or velocity and then summing over the gauge-length of the fiber. As the basis of the main inversion algorithms (e.g., migration or full waveform inversion), which allow getting a model of the subsurface parameters, is to minimize the difference between the seismic data recorded on the field and the numerically modelled data, the ability to directly model fiber data can be very useful. For instance, if the seismic data is recorded using distributed fiber optic sensors, the measured data would not need to be transformed into velocity or acceleration measurements, but instead can be directly used in the inversion algorithms by comparing them to the modelled fiber data.

Low Frequency Recording

The DVS sensor offers opportunity to easily record low frequency signals that are not accessible when using standard sensors that typically are available to the geophysical exploration industry. Long fibers distributed in wells or in the surface can be made sensitive to very low frequencies by interrogating the fibers with very long gauge lengths.

Acoustic signals associated with fluid flow in the reservoir, slug flow and mechanical deformation within the reservoir can then be recorded to augment the shorter period seismic signals associated with both active seismic surveys and microseismic surveying (i.e., recording micro-seismic events caused by geomechanical rock failure where reservoir stress causes the rock to fracture).

Such very low frequency signals can also be processed using interferometric techniques to monitor reservoir changes. The versatility of the distributed fiber optic sensing system is such that raw data from the same sensor can be processed to yield the very high frequency signals for micro-seismic recording (up to, for example, 1500 Hz), the usual active source seismic signals (e.g., 1-250 Hz), and ultra-low frequency signals (e.g., 0.001-1.0 Hz).

Acoustic Logging, Intermediate Seismo-Acoustic Surveying and Cross-well Surveying; Reservoir Monitoring The sensor designs described herein and the techniques described for compensating spectral responses of the sensor can all be applied to the area of acoustic logging, intermediate seismo-acoustic surveying and cross-well surveying. Acoustic logging tools are often deployed into boreholes to provide very high resolution information about the rock and fluid properties in the immediate vicinity of the borehole. High frequency acoustic and elastic signals (typically 2000-10,000 Hz) are emitted using acoustic sources in the borehole and their signals are recorded using electronic based sensors. These complex electronic-based sensors can be replaced with a distributed fiber optic-based system. The versatility of the distributed fiber optic sensors described herein means that effectively the same borehole detector tool can be used for all logging and surveying applications.

Further, many reservoirs are penetrated by many wells emanating from few or even a single production platform. By deploying optical fiber sensors in most or all of these wells, active seismic surveys, micro-seismic surveys, cross-well surveys and ultra-low frequency monitoring surveys can all be performed, enabling accurate and valuable reservoir monitoring opportunities.

Torsion Sensor

Distributed fiber optic sensors can be excited by acoustic waves that apply torsional strain on the sensor. Torsional strain can be a problem in certain applications (such as sea-bed, land, borehole, towed-marine, permanent deployment, flow monitoring applications). Embodiments of the sensors discussed herein can be arranged to provide a torsion-free set of data.

Figure 28:
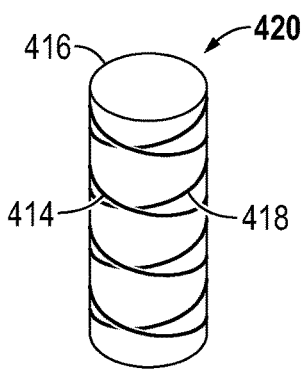
FIG. 28 is a schematic illustration of an exemplary fiber optic torsion sensor, according to an embodiment.

Several configurations of sensors with spatially arranged optical fibers have been discussed above. One of those configurations is a fiber that is helically wound about a mandrel. When two helical patterns are co-located on the same mandrel, but wound in opposite directions, a torsion-free measurement can be provided. Such a configuration 420 is shown in FIG. 28, where a first helix 414 is wound about a mandrel 416. A second helix 418 is wound about the mandrel 416 in the opposite direction. In some embodiments, the helices 414 and 418 can be looped back up and down the cable so that only a single interrogation and acquisition system is used to obtain the responses of both helices 414 and 418.

The torsional sensor 420 shown in FIG. 28 effectively measures the curl of the wavefield, which is useful (as examples) for ground roll prediction and removal. Subtracting the response of the first helix 414 from the response of the second helix 418 extracts the torsion motion of the sensor 420 (e.g., higher order Stonely waves for borehole applications, Rayleigh waves for land applications, and Scholte waves for sea-floor surveying). Torsional movement often presents difficulties with measurements obtained with marine streamers. Thus, in such applications, the torsional sensor 420 can be used to correct the acquired data. Torsional movement detection has further applications in the field of gyroscopes, electrical submersible pumps and drilling, where measurement of torsional modes can be used to characterize performance.

In some embodiments, the systems and techniques described herein may be employed in conjunction with an intelligent completion system disposed within a well that penetrates a hydrocarbon-bearing earth formation. Portions of the intelligent completion system may be disposed within cased portions of the well, while other portions of the system may be in the uncased, or open hole, portion of the well. The intelligent completion system can comprise one or more of various components or subsystems, which include without limitation: casing, tubing, control lines (electric, fiber optic, or hydraulic), packers (mechanical, sell or chemical), flow control valves, sensors, in flow control devices, hole liners, safety valves, plugs or inline valves, inductive couplers, electric wet connects, hydraulic wet connects, wireless telemetry hubs and modules, and downhole power generating systems. Portions of the systems that are disposed within the well can communicate with systems or sub-systems that are located at the surface. The surface systems or sub-systems in turn can communicate with other surface systems, such as systems that are at locations remote from the well.

While the invention has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A method of determining velocity components of an acoustic wavefield incident on a distributed fiber optic sensor, comprising:
    providing a distributed fiber optic sensor that is configured to provide a distributed response to an incident acoustic wavefield, the fiber optic sensor including fiber that is spatially distributed in planes of a three-dimensional volume having three orthogonal axes, the fiber including:
        a first fiber pattern that is spatially distributed within a first plane of the three-dimensional volume; and,
        a second fiber pattern that is spatially distributed within a second plane of the volume that is non-parallel to the first plane;
    launching optical energy into the fiber optic sensor to obtain individual responses from each of the first fiber pattern and the second fiber pattern to the incident acoustic wavefield, and
    processing the individual responses to determine separate velocity components of the acoustic wavefield relative to orthogonal axes of the three-dimensional volume.

2. The method as recited in claim 1, wherein the first fiber pattern has a first effective length and a second effective length along respective orthogonal axes of the three-dimensional volume, and the second fiber pattern has a third effective length and a fourth effective length along respective orthogonal axes of the three-dimensional volume, and wherein the separate velocity components are determined based on a sum of the first effective length and the second effective length and a sum of the third effective length and the fourth effective length.

3. The method as recited in claim 1, wherein the fiber further includes a third fiber pattern that is spatially distributed within a third plane of the volume that is non-parallel to the first plane and the second plane, and wherein launching optical energy is further to obtain an individual response from the third fiber pattern, and wherein the individual responses are processed to determine separate velocity components of the acoustic wavefield separately along each of the three orthogonal axes of the three-dimensional volume.

4. The method as recited in claim 3, wherein the first plane, second plane and third plane are orthogonal to each other.

5. . The method as recited in claim 4, wherein each of the first, second and third fiber patterns has an effective length ratio of approximately 1:1 in each of the orthogonal axes of the respective orthogonal planes.

6. The method as recited in claim 3, wherein the separate velocity components are determined based on a sum of effective lengths of the first fiber pattern along orthogonal axes of the volume, a sum of effective lengths of the second fiber pattern along orthogonal axes of the volume, and a sum of effective lengths of the third fiber pattern along orthogonal axes of the volume.

7. The method as recited in claim 6, wherein each of the first, second and third fiber patterns has a circular shape.

8. The method as recited in claim 3, wherein dimensions of at least one of the first, second and third fiber patterns are selected so that the at least one of the first, second and third fiber patterns has a different wavenumber response than the other of the first, second and third fiber patterns.

9. The method as recited in claim 8, wherein the dimensions of the first fiber pattern are selected so that the wavenumber response of the first fiber pattern fills a notch in the wavenumber response of at least one of the second fiber pattern and the third fiber pattern.

10. The method as recited in claim 6, wherein at least one of the first, second and third fiber patterns has a different effective length ratio than the other of the first, second and third fiber patterns.

11. The method as recited in claim 2, wherein the first fiber pattern is a serpentine and the second fiber pattern is a straight line.

12. The method as recited in claim 1, further comprising providing a plurality of point sensors to monitor the acoustic wavefield at a plurality of corresponding point locations, and wherein processing includes combining responses of the point sensors to the acoustic wavefield with the individual responses of the first and second fiber patterns to determine direction of travel of the acoustic wavefield.

13. A method of determining velocity components of an acoustic wavefield incident on a distributed fiber optic sensor, comprising:
    providing a distributed fiber optic sensor that is configured to provide a distributed response to an incident acoustic wavefield, the fiber optic sensor including fiber that is spatially distributed in a three-dimensional volume having three orthogonal axes, the fiber including:
        a first fiber pattern that is helically wound about a tubular support structure; and
        a second fiber pattern that is spatially distributed within a first plane of the three-dimensional volume;
    launching optical energy into the fiber optic sensor to obtain individual responses from each of the first fiber pattern and the second fiber pattern to the incident acoustic wavefield, and processing the individual responses to determine separate velocity components of the acoustic wavefield relative to the orthogonal axes of the three-dimensional volume.

14. The method as recited in claim 13, wherein the fiber further includes a third fiber pattern that is spatially distributed within a second plane of the three-dimensional volume, and wherein processing determines a velocity component of the acoustic wavefield along each of the three orthogonal axes of the volume.

15. The method as recited in claim 14, wherein the second fiber pattern is a serpentine.

16. The method as recited in claim 15, wherein the third fiber pattern is a serpentine.

17. The method as recited in claim 16, where a lay angle of the helically wound first fiber pattern is modulated along the length of the tubular support structure.

18. The method as recited in claim 13, wherein the tubular support structure has a diameter that is modulated along its length.

19. The method as recited in claim 13, wherein the tubular support structure is a mandrel made of a material having different compliances.

20. The method as recited in claim 19, wherein the material has a first a first compliance along a longitudinal axis of the mandrel and a second compliance along a transverse axis of the mandrel.

21. The method as recited in claim 13, further comprising deploying the fiber optic sensor in a wellbore.

22. The method as recited in claim 13, further comprising towing the fiber optic sensor in a marine streamer.

23. A method of determining direction of travel of an acoustic wavefield, comprising:
providing a fiber optic sensor that is configured to provide a distributed response to an incident acoustic wavefield;
launching optical energy into the fiber optic sensor and detecting backscatter generated by the fiber sensor in response to the launched optical energy;
acquiring, from the detected backscatter, a data set representing strain imparted on the fiber optic sensor by the incident acoustic wavefield;
determining from the data set, a spatial gradient of the strain;
determining a polarity mask based on the spatial gradient; and
applying the polarity mask to the data set to determine direction of travel of the acoustic wavefield.

24. The method as recited in claim 23, further comprising deploying the fiber optic sensor in a wellbore.

25. The method as recited in claim 23, further comprising towing the fiber optic sensor in a marine streamer.

26. A method, comprising:
providing a distributed fiber optic sensor that is configured to provide a distributed response to an incident acoustic wavefield, the fiber optic sensor including fiber that is spatially distributed in non-parallel planes of a three-dimensional volume having three orthogonal axes, the fiber including:
a first helical pattern wound about a mandrel in a first direction;
a second helical pattern wound about the mandrel in a second direction opposite the first direction;
launching optical energy into the fiber optic sensor to obtain individual responses from each of the first fiber pattern and the second fiber pattern to the incident acoustic wavefield, and
processing the individual responses to determine a torsional component of the acoustic wavefield.

27. The method as recited in claim 26, further comprising deploying the distributed fiber optic sensor in a marine streamer.

* * * * *